United States Patent
Zakoji

(10) Patent No.: US 9,323,139 B2
(45) Date of Patent: Apr. 26, 2016

(54) LIGHT SOURCE DEVICE AND PROJECTOR

(75) Inventor: Makoto Zakoji, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 547 days.

(21) Appl. No.: 13/564,855

(22) Filed: Aug. 2, 2012

(65) Prior Publication Data

US 2013/0038842 A1    Feb. 14, 2013

(30) Foreign Application Priority Data

Aug. 9, 2011    (JP) .................................. 2011-173736

(51) Int. Cl.
| | | |
|---|---|---|
| *F21V 19/00* | (2006.01) | |
| *G03B 21/20* | (2006.01) | |
| *H01S 5/022* | (2006.01) | |
| *G03B 21/16* | (2006.01) | |
| *G03B 33/12* | (2006.01) | |

(52) U.S. Cl.
CPC ........ *G03B 21/2013* (2013.01); *F21V 19/0015* (2013.01); *G03B 21/204* (2013.01); *H01S 5/022* (2013.01); *G03B 21/16* (2013.01); *G03B 33/12* (2013.01)

(58) Field of Classification Search
CPC . F21V 19/004; F21V 19/0015; F21V 19/001; H01S 5/02236; H01S 5/022
USPC ............. 353/102, 122, 31; 362/259, 84, 97.3, 362/249.02, 800
See application file for complete search history.

(56) References Cited

U.S. PATENT DOCUMENTS

| | | | |
|---|---|---|---|
| 7,210,833 B2* | 5/2007 | Gasquet et al. ............... | 362/548 |
| 8,106,935 B2 | 1/2012 | Watanabe | |
| 8,348,461 B2* | 1/2013 | Wilcox et al. ............ | 362/249.02 |
| 2005/0024834 A1 | 2/2005 | Newby | |
| 2009/0027884 A1* | 1/2009 | Chou ............................ | 362/240 |
| 2011/0273895 A1 | 11/2011 | Uemoto et al. | |
| 2014/0119031 A1* | 5/2014 | Van Gompel et al. ... | 362/311.02 |
| 2014/0198509 A1* | 7/2014 | Takiguchi et al. ............ | 362/382 |

FOREIGN PATENT DOCUMENTS

| | | |
|---|---|---|
| CN | 101226976 A | 7/2008 |
| CN | 101337471 A | 1/2009 |
| JP | 58-184862 U | 12/1983 |
| JP | 02-114952 U | 9/1990 |
| JP | 2004-297065 A | 10/2004 |
| JP | 2007-500448 A | 1/2007 |
| JP | 2011-076781 A | 4/2011 |
| WO | WO-2005-013366 | 2/2005 |
| WO | WO-2011-039998 | 4/2011 |

* cited by examiner

*Primary Examiner* — William C Dowling
(74) *Attorney, Agent, or Firm* — ALG Intellectual Property, LLC

(57) ABSTRACT

A light source device includes a solid-state light source emitting light, a base member having an arrangement surface (front portion) on which the solid-state light source is arranged, and a pressing member having a pressing portion (projection) provided on the base member to fix the solid-state light source through pressing of the solid-state light source toward the arrangement surface (front portion). Through this, the solid-state light source can be easily arranged on the base member as compared with a case where the solid-state light source is fixed by welding.

12 Claims, 15 Drawing Sheets

LIGHT SOURCE DEVICE AND PROJECTOR

BACKGROUND

1. Technical Field

The present invention relates to a light source device and a projector, and more particularly, to a light source device and a projector which have solid-state light sources.

2. Related Art

In the related art, a projector is known which includes a light source device, a light modulating device that forms an image according to image information through modulation of light flux emitted from a light source, and a projection optical device that expands and projects the image on a projection surface such as a screen.

As such a light source device, a light source device having a discharge light source lamp such as an extra-high pressure mercury lamp has been adopted. However, recently, from requests for increased power saving, a light source device having solid-state light sources has been adopted. As such alight source device, a light source device having solid-state light sources, such as LEDs (Light Emitting Diodes), has been adopted (for example, see JP-A-2004-297065).

The light source device described in JP-A-2004-297065 includes an LED having a copper base known as slag and two electrodes, a radiating element (radiator) including a copper plate on which the LED is arranged, and an insulating support to which the radiating element is fixed. The LED is fixed to the radiating element through self-welding between a nickel layer of the radiating element and the base of the LED using a laser spot.

However, in the light source device described in JP-A-2004-297065, since the LED is fixed to the radiating member by laser spot welding, the LED installation work is complicated. The complexity of such work causes lengthening of the process of manufacturing the light source device and increases in the manufacturing cost of the light source device.

Further, since the LED has been welded, it is not easy to replace the LED when a problem occurs in the LED.

From these problems, configurations that can arrange a solid-state light source more easily have been requested.

SUMMARY

An advantage of some aspects of the invention is to provide a light source device and a projector that can easily arrange solid-state light sources.

An aspect of the invention is directed to a light source device, which includes a solid-state light source emitting light; a base member having an arrangement surface on which the solid-state light source is arranged; and a pressing member having a pressing portion provided on the base member to fix the solid-state light source through pressing of the solid-state light source toward the arrangement surface.

According to the aspect of the invention, the solid-state light source is pressingly fixed onto the arrangement surface of the base member by the pressing portion of the pressing members provided on the base member. Through this, the mounting of the solid-state light source on the base member can be easily performed as compared with a case where the solid-state light source is mounted by laser spot welding. Accordingly, the solid-state light source can be easily arranged on the base member.

Further, through removing of the pressing member, the solid-state light source can be removed from the base member. Through this, even if a problem occurs in the solid-state light source, the solid-state light source can be replaced. Accordingly, the maintenance properties of the light source device can be improved.

In the aspect of the invention, it is preferable that the pressing member have an opening through which light emitted from the solid-state light source is transmitted, and the pressing portion be a projection positioned at an edge of the opening to project toward an inside of the opening.

According to this configuration, since the opening is formed on the pressing member, the path of the light that is emitted from the solid-state light source to the outside of the light source device can be ensured even if the pressing member is provided to cover the solid-state light source. Further, since the pressing portion is positioned at the edge of the opening and is the projection that projects toward the inside of the opening, the projection can reliably be in contact with the solid-state light source that is positioned inside the opening while the pressing portion can be easily formed. Accordingly, the pressing force can reliably act on the solid-state light source.

In the aspect of the invention, it is preferable that the projection be formed in a substantially trapezoidal shape in plan view in which the width dimension becomes smaller along the projection towards the inside of the opening from the edge of the opening.

Here, if the pressing force acts on the solid-state light source in a state where the projection that projects from the edge of the opening is in contact with the solid-state light source positioned inside the opening, a great load is applied to an area in the vicinity of the edge of the opening through the projection.

In contrast, since the projection is formed in a substantially trapezoidal shape in plan view in which the width dimension becomes smaller as the projection is directed from the edge of the opening to the inside of the opening, that is, as the projection projects from the edge of the opening, the width dimension in the vicinity of the edge of the opening can be increased. Through this, the load that acts on the area in the vicinity of the edge can be dispersed. Accordingly, the strength of the projection can be enhanced, and thus the pressing force can reliably act on the solid-state light source.

In the aspect of the invention, it is preferable that a plurality of the solid-state light sources be arranged in a straight line along a predetermined direction, and the pressing portion be provided so that a projection direction of the pressing portion from the edge of the opening is inclined with respect to the predetermined direction.

Here, the solid-state light source, for example, may be a solid-state light source that includes a stem that has a substantially circular shape in plan view, a light-emitting element and a cap arranged on an upper surface of the stem, and terminals extending from a lower surface of the stem. In the case where the solid-state light sources are densely arranged in the predetermined direction, a large gap between the solid-state light sources is formed in a position on the straight line along the direction that is inclined with respect to the predetermined direction (for example, the direction that is inclined by 45 degrees in plan view).

By arranging the pressing portion in the gap, the respective solid-state light sources can reliably be pressingly fixed to the base member even if the respective solid-state light sources are densely arranged. Accordingly, miniaturization of the light source device can be attained.

In the aspect of the invention, it is preferable that the light source device further include a position determination member provided between the base member and the pressing member to determine the position of the solid-state light source arranged on the base member, and a fixing member mounted on the base member to fix the pressing member to the base member.

According to this configuration, since the position of the solid-state light source arranged on the arrangement surface of the base member is determined by the position determination member, the arrangement accuracy of the solid-state light source that is pressed by the pressing member can be improved.

Further, since the pressing member is fixed to the base member by the fixing member, the pressing member can be stably fixed to the base member. Further, the arrangement of the solid-state light source can be stabilized.

In the aspect of the invention, it is preferable that a plurality of the solid-state light sources be arranged on the base member, and the pressing member has a plurality of the pressing portions pressing the solid-state light sources.

According to this configuration, since the plurality of the solid-state light sources can be pressingly fixed by one pressing member, efforts to pressingly fix every solid-state light source through the pressing member can be reduced. Accordingly, the process of manufacturing the light source device can be simplified.

Another aspect of the invention is directed to a projector including the above-described light source device, a light modulating device modulating light flux emitted from the light source device, and a projection optical device projecting the modulated light flux.

According to this aspect of the invention, the same effect as the above-described light source device can be achieved. Further, the solid-state light source in which a problem has occurred can be easily replaced, and thus maintenance of the projector can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
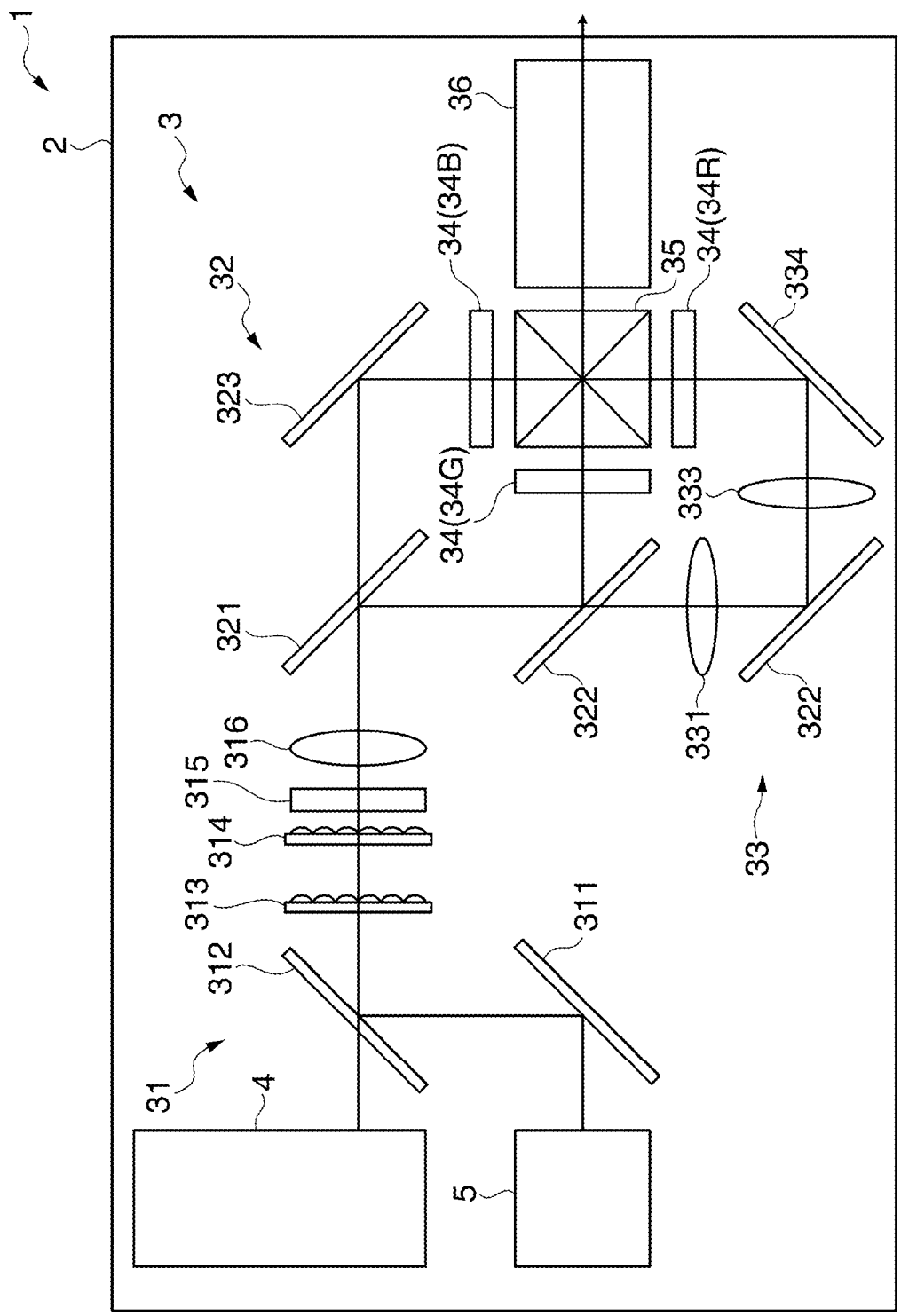
FIG. 1 is a schematic diagram illustrating the configuration of a projector according to a first embodiment of the invention.

Hereinafter, a first embodiment of the invention will be described with reference to the accompanying drawings.
Overall Configuration of Projector Projector 1 according to a first embodiment of the invention forms an image according to image information through modulation of light flux emitted from a light source device provided therein, and expands and projects the image on a projection surface such as a screen. Such a projector 1, as shown in FIG. 1, includes a case 2 made of metal or a synthetic resin and an optical device 3 accommodated in the case 2. In addition, although not illustrated, the projector 1 includes a control device controlling the operation of the projector 1, a power supply device supplying power to electronic components that constitute the projector 1, and a cooling device cooling a target to be cooled such as the light source device.
Configuration of Optical Device The optical device 3 forms an image according to an image signal input from the above-described control device, and projects the image. The optical device 3 includes a first light source device 4, a second light source device 5, a uniform illumination device 31, a color separation device 32, a relay device 33, a light modulating device 34, a color synthesis device 35, and a projection optical device 36.

The first light source device 4 emits light including green light and red light toward a dichroic mirror 312 that constitutes the uniform illumination device 31. Further, the configuration of the first light source device 4 will be described in detail later.

The second light source device 5 emits blue light toward a total reflection mirror 311 that constitutes the uniform illumination device 31. Although not illustrated in detail, in the second light source device 5, a plurality of LDs (Laser Diodes) or LEDs (Light Emitting Diodes) that emit blue light are arranged.

The uniform illumination device 31 synthesizes the lights incident from the first light source device 4 and the second light source device 5, and substantially uniformly illuminates the respective light modulating devices 34 to be described later using the synthesized light. This uniform illumination device 31 includes the total reflection mirror 311, the dichroic mirror 312, a pair of lens arrays 313 and 314, a polarization conversion element 315, and a superimposition lens 316.

The total reflection mirror 311 reflects the blue light incident from the second light source device 5 toward the dichroic mirror 312.

The dichroic mirror 312 transmits and leads the light, which includes the green light and the red light incident from the first light source device 4, to the lens array 313, and reflects the blue light, which is incident from the second light source device 5 through the total reflection mirror 311, toward the lens array 313.

The lens array 313, although not illustrated, has small lenses that divide the light flux incident from the dichroic mirror 312 into a plurality of partial light fluxes.

The lens array 314 has small lenses that correspond to the small lenses of the lens array 313, and superimposes the respective partial light fluxes incident from the lens array 313 on the light modulating device 34 together with the superimposition lens 316.

The polarization conversion element 315 is arranged between the lens array 314 and the superimposition lens 316, and converts the light from the lens array 314 into one type of linearly polarized light.

The color separation device 32 separates respective color lights of red (R), green (G), and blue (B) from the light incident from the uniform illumination device 31. This color separation device 32 includes a dichroic mirror 321 that transmits the blue light and reflects the green light and the red light, a dichroic mirror 322 that reflects the green light toward the light modulating device 34 (34G) for green light and transmits the red light, and a reflection mirror 323 that reflects and leads the incident blue light to the light modulating device 34 (34B) for blue light.

The relay device 33 leads the red light transmitted through the dichroic mirror 322 to the light modulating device 34 (34R) for red light, and includes an incident side lens 331, a relay lens 333, and total reflection mirrors 332 and 334. Although this relay device 33 is to prevent the deterioration of utilization efficiency of the red light due to diffusion or the like, it may be configured to transmit another color light (for example, blue light) instead of the red light.

The light modulating device 34 (light modulating devices for red light, green light, and blue light are respectively denoted by 34R, 34G, and 34B) forms an image according to the image signal input from the control device through modulation of the incident light flux. Although not illustrated in detail, the light modulating device 34 includes a liquid crystal panel that is driven according to the image signal and a liquid crystal light valve having a pair of polarizing plates sandwiching the liquid crystal panel.

The color synthesis device 35 is composed of a cross dichroic prism. This color synthesis device 35 forms a full-color image through synthesis of modulated light (image) for each color light that is incident from the respective light modulating device 34.

The projection optical device 36 expands and projects the image synthesized by the color synthesis device 35 on the projection surface. This projection optical device 36, although not illustrated in detail, is configured as a lens pair having a lens tube and a plurality of lenses arranged in the lens tube.

Configuration of First Light Source Device

Figure 2:
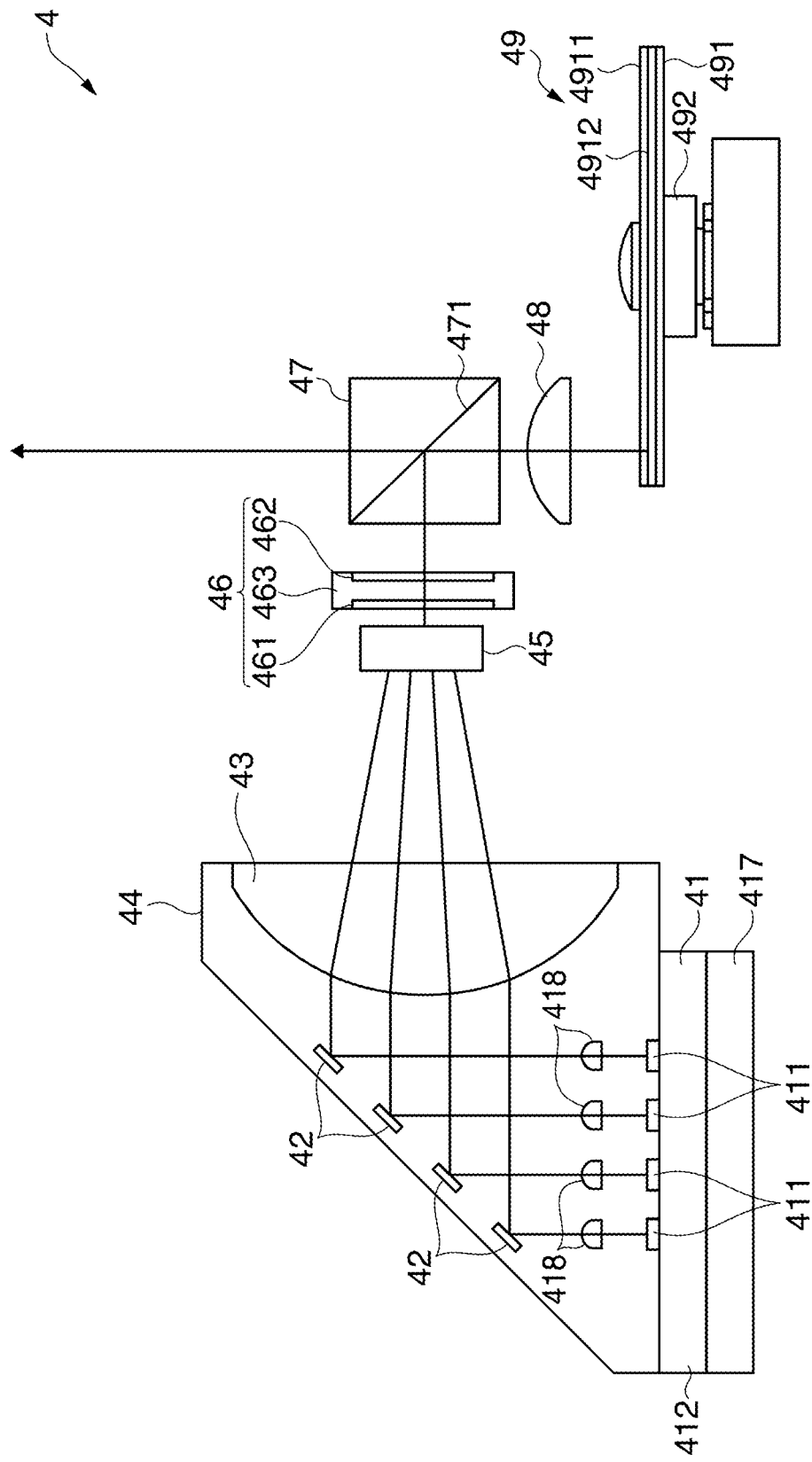
FIG. 2 is a schematic diagram illustrating a first light source device according to the first embodiment.

FIG. 2 is a schematic diagram illustrating the configuration of the first light source device 4.

The first light source device 4 corresponds to the light source device according to the invention, and as described above, emits the light including the green light and the red light to the dichroic mirror 312. As shown in FIG. 2, the first light source device 4 includes a light source unit 41, a reflection mirror 42, a condensing lens 43, a case 44, a parallelization lens 45, a uniformization device 46, a dichroic prism 47, a pickup lens 48, and a wavelength conversion device 49.

The light source unit 41 includes a plurality of solid-state light sources 411 and a plurality of parallelization lenses 418 provided according to the respective solid-state light sources 411, and makes the lights emitted from the respective solid-state light sources 411 incident to the reflection mirror 42 through the parallelization lens 418. Further, in this embodiment, each of the solid-state light sources 411 is composed of LDs emitting color light (for example, color light of ultraviolet region or blue light) of a predetermined wavelength. The configuration of the light source unit 41 will be described in detail later.

The reflection mirror 42 is formed in a rectangular shape viewed from the front, and is provided depending on the column of the solid-state light sources 411. The reflection mirror 42 reflects parallel lights incident from the solid-state light sources 411 through the parallelization lens 418 substantially parallel to each other toward the condensing lens 43. Further, in this embodiment, a reflection mirror 42 is provided for each column of the solid-state light sources 411. However, the invention is not limited thereto, and reflection mirrors 42 may be provided according to the respective solid-state light sources 411.

The condensing lens 43 collects the lights incident from the respective reflection mirrors 42 into light flux, and emits the light flux toward the parallelization lens 45.

The case 44 is formed of metal or synthetic resin, and holds the respective reflection mirrors 42 and the condensing lens 43 therein. The light source unit 41 is mounted on the case 44.

The parallelization lens 45 converts the incident light flux into parallel light along the center axis of the light flux, and emits the parallel light to the uniformization device 46.

The uniformization device 46 uniformizes the in-plane illumination (illumination in the plane that is orthogonal to the center axis of the light flux) of the light flux incident from the parallelization lens 45. The uniformization device 46 includes a first lens array 461 and a second lens array 462, which have the same configuration as the above-described lens arrays 313 and 314, and a support member 463.

The dichroic prism 47 has a separation layer 471 which reflects the light of less than a predetermined wavelength and transmits the light of equal to or more than the predetermined wavelength. In this embodiment, the separation layer 471 reflects the light of ultraviolet region that is incident from the uniformization device 46 toward the pickup lens 48, and bends the light path of the light by approximately 90 degrees. Further, the separation layer 471 transmits the light (light wavelength-converted by the wavelength conversion device 49) incident through the pickup lens 48. The light transmitted through the separation layer 471 is incident to the above-described dichroic mirror 312.

The pickup lens 48 superimposes the respective partial light fluxes incident through the dichroic prism 47 on a predetermined region of a phosphor layer 4911 of the wavelength conversion device 49. In addition, the pickup lens 48 parallelizes the light wavelength-converted by the wavelength conversion device 49 and makes the parallelized light incident to the dichroic mirror 312 through the dichroic prism 47.

The wavelength conversion device 49 converts the wavelength of the incident light and emits the converted light. The wavelength conversion device 49 includes a wheel 491 and a rotary unit 492.

Among them, the rotary unit 492 is composed of a wheel motor that rotates the central axis of the wheel 491 as a rotating axis. Through being rotated by the rotary unit 492, the wheel 491 is cooled.

The wheel 491 includes a reflection layer 4912 formed on a surface opposite the pickup lens 48 by vapor deposition of silver and a phosphor layer 4911 laminated on the reflection layer 4912. The phosphor layer 4911 includes phosphor which absorbs the light incident from the pickup lens 48 to be excited and emits light of a predetermined wavelength in all directions. Further, in this embodiment, the phosphor absorbs the light of ultraviolet region and emits light including the green light and red light. The light wavelength-converted by the phosphor is reflected by the reflection layer 4912 to be incident to the pickup lens 48, transmitted through the pickup lens 48 and the dichroic prism 47, and then incident to the dichroic mirror 312, in addition to being directly incident to the pickup lens 48.

Configuration of Light Source Unit

Figure 3:
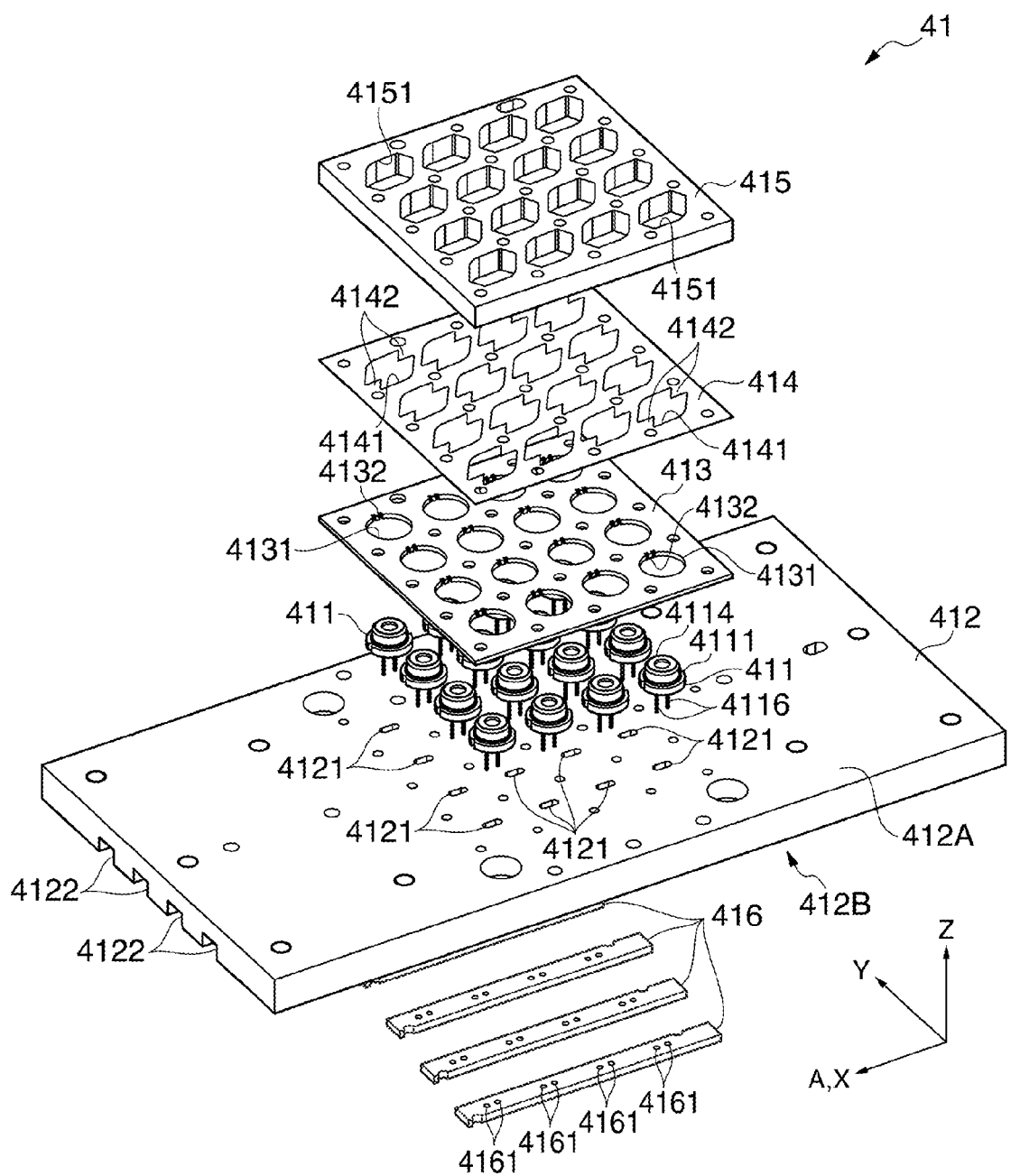
FIG. 3 is an exploded perspective view illustrating a light source unit according to the first embodiment.

FIG. 3 is an exploded perspective view illustrating the light source unit 41. In the following description and illustration, it is assumed that when the base member 412 is viewed from the front, directions orthogonal to each other are the X direction and the Y direction, and a direction which is orthogonal to a front portion 412A of the base member 412 and away from the front portion 412A is the Z direction. Further, in this embodiment, the X direction is a direction along the length direction of the front portion 412A.

As described above, the light source unit 41 emits lights from the respective solid-state light sources 411 and makes the emitted lights incident to the respective reflection mirrors 42 through the parallelization lens 418. As shown in FIG. 3, the light source unit 41 includes the base member 412, a spacer 413, a pressing member 414, a fixing member 415, a substrate 416, and a heat dissipation member 417 (see FIG. 2) in addition to the respective solid-state light sources 411 and the respective parallelization lenses 418.

Among them, the heat dissipation member 417 is a heat sink which is heat-conductively connected to a rear portion 412B of the base member 412 to dissipate the heat conducted from the base member 412. The heat dissipation member 417 includes a plurality of fins, and between these fins, cooling air that blows from the above-described cooling device is distributed. Through this, the heat dissipation member 417, and further, the base member 412 and the solid-state light sources 411 are cooled.

Configuration of Solid-state Light Source

Figure 4:
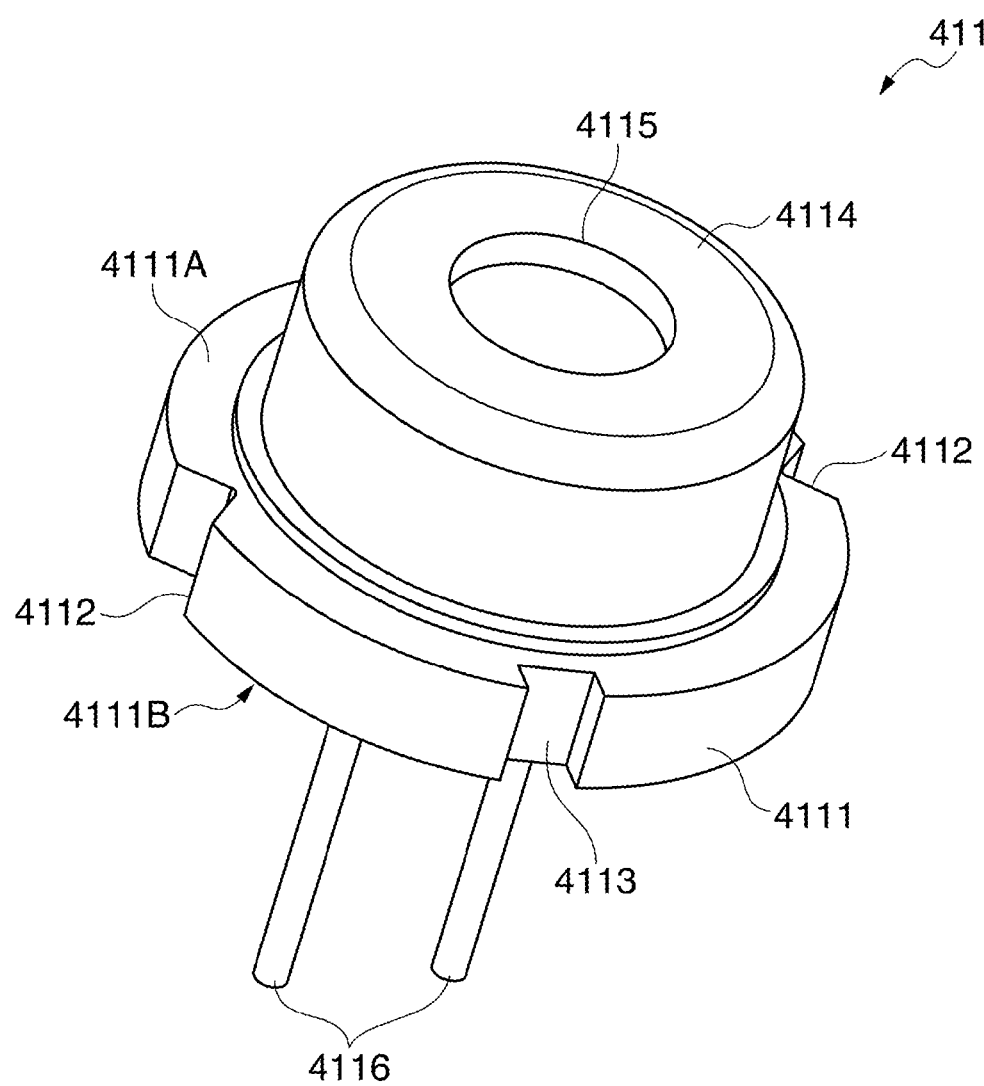
FIG. 4 is a perspective view illustrating a solid-state light source according to the first embodiment.

FIG. 4 is a perspective view illustrating a solid-state light source 411.

The solid-state light source 411, as shown in FIG. 4, includes a stem 4111, a post and a light-emitting element (not illustrated) arranged on an upper surface 4111A of the stem 4111, a cap 4114, and a pair of terminals 4116.

The stem 4111 is a substantially circular plate-like body in plane view. On a side surface of the stem 4111, a pair of first concave portions 4112 positioned opposite each other and a second concave portion 4113 positioned in the middle of the pair of first concave portions 4112 are formed. Into the second concave portion 4113, a convex portion 4132 of a spacer 413 to be described later is inserted.

Although not illustrated in detail, the post is formed in a semicircular columnar shape, and a light-emitting element is provided on the side surface of the post. As viewed from a position opposite the upper surface 4111A, this light-emitting element is positioned substantially in the center of the upper surface 4111A. Because of this, the post is eccentrically arranged on the upper surface 4111A. The post functions to conduct the heat generated from the light-emitting element to the stem 4111.

The cap 4114 is provided on the upper surface 4111A to cover the post and the light-emitting element. On the cap 4114, a substantially circular opening 4115 in plan view is formed to transmit the light emitted from the light-emitting element.

The pair of terminals 4116 is extended from the bottom surface 4111B of the stem 4111 in substantially the same dimensions. Further, in the following description, the direction connecting the pair of terminals 4116 is a direction connecting the pair of terminals 4116 when the solid-state light source 411 is viewed from the side of the cap 4114 in plan view, and is described and illustrated as Direction A.

Configuration of Base Member

Referring again to FIG. 3, the base member 412 is formed of heat conductive metal (for example, aluminum) in a substantially rectangular parallelepiped shape overall. The front portion 412A of the base member 412 is a surface on which stems 4111 of the respective solid-state light sources 411 are arranged, and is formed in a planar shape. That is, the front portion 412A and the bottom surface 4111B of the stem 4111 are in surface contact with each other. The front portion 412A functions as the planar portion and an arrangement surface according to the invention.

The base member 412 has a plurality of hole portions 4121 formed to penetrate through the base member 412 from the front portion 412A to the rear portion 412B. The hole portions 4121 are in an elliptical shape in plan view, and are formed in a matrix shape so as to form a plurality of rows and a plurality of columns along the X direction and Y direction. Through this, in the front portion 412A, the solid-state light sources 411 are arranged in a matrix shape so as to form a plurality of rows and a plurality of columns. Further, in this embodiment, total 16 hole portions 4121 of 4 rows and 4 columns are formed.

A pair of terminals 4116 are inserted into the hole portions 4121. The major axis direction of the hole portion 4121 is the X direction, and when the terminal 4116 is inserted into the hole portion 4121, the direction (Direction A) connecting the pair of terminals 4116 coincides with the X direction.

In addition, on the front portion 412A, a plurality of screw holes for fixing screws (not illustrated) for fixing the spacer 413, the pressing member 414, and the fixing member 415 to the base member 412 and a plurality of holes for fixing the base member 412 to another member are formed.

On the rear portion 412B of the base member 412, a plurality of groove portions 4122 along the X direction are formed depending on the lines of the hole portions 4121. In other words, the respective groove portions 4122 are formed depending on the positions of the adjacent hole portions 4121 along the X direction. In these groove portions 4122, the substrates 416 are arranged.

Configuration of Substrate

The substrate 416 is electrically connected to the terminals 4116 inserted into the hole portions 4121 on the side of the rear portion 412B thereof. The substrate 416 is formed in a rectangular shape in plan view in which the length direction becomes the X direction, and in other words, the substrate 416 has a shape elongated along the Direction A that is the direction connecting a pair of terminals 4116 inserted into the hole portions 4121. On the substrate 416, hole portions 4161 into which the terminals 4116 are inserted are formed.

Configuration of Spacer

The spacer 413 is a metal member that is in a substantially rectangular shape in plan view and has heat conductivity. The spacer 413 is fixed to the base member 412 by screws (not illustrated) together with the pressing member 414 and the fixing member 415 to be described later. The spacer 413 corresponds to the position determination member according to the invention, and in positions corresponding to the hole portions 4121 of the spacer 413, substantially circular openings 4131 are formed to penetrate through the spacer 413 in the thickness direction (Z direction). That is, the openings 4131 are formed in a matrix shape so as to form a plurality of rows and a plurality of columns along the X direction and the Y direction.

Further, the thickness dimension of the spacer 413 is set to a value smaller than the thickness dimension of the stem 4111 of the solid-state light source 411 to be described later.

Figure 5:
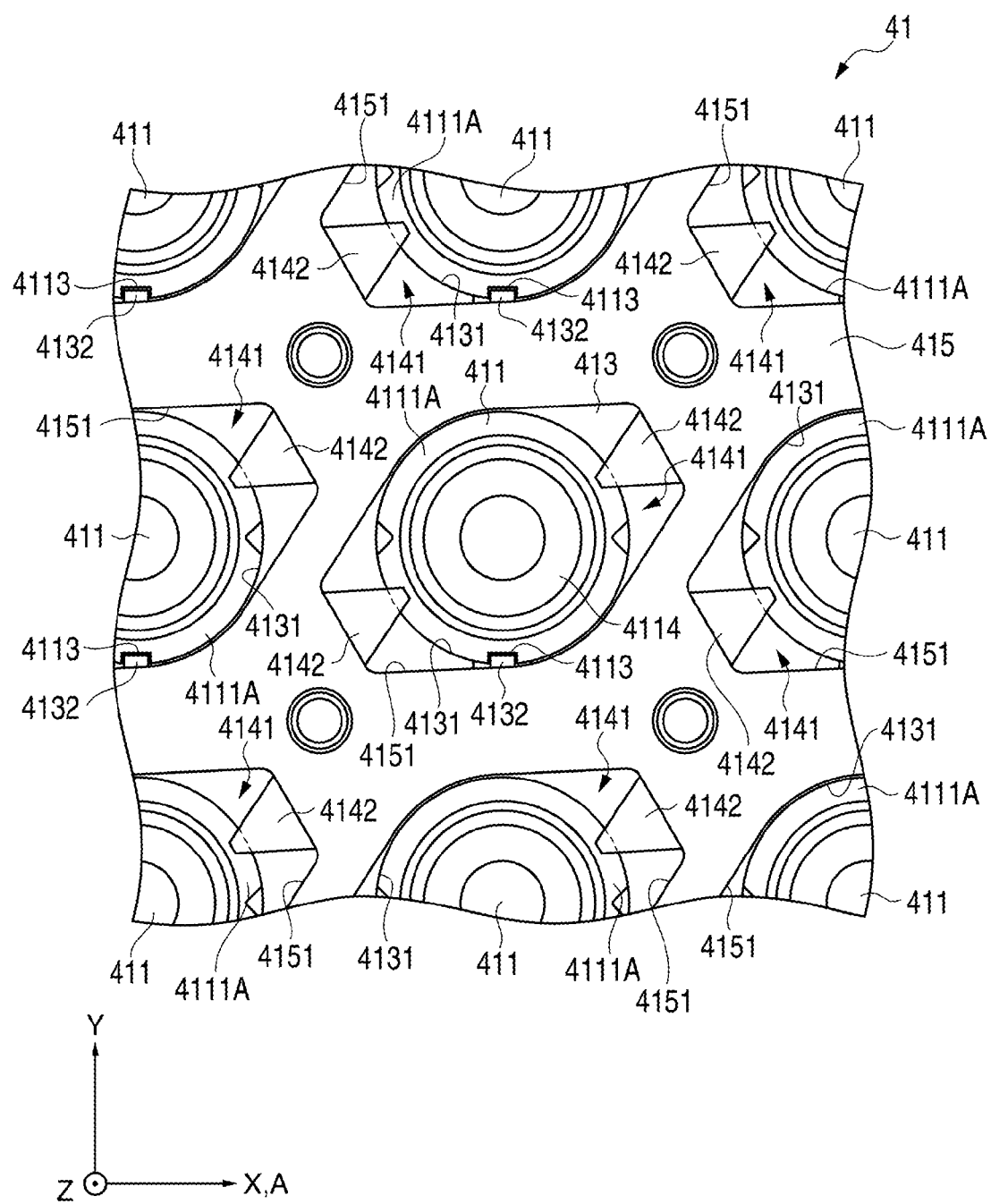
FIG. 5 is a plan view illustrating a part of a light source unit according to the first embodiment.

FIG. 5 is a plan view showing an enlarged part of the light source unit 41.

In the opening 4131, as shown in FIG. 5, a solid-state light source 411 is arranged. At an edge of the opening 4131, a convex portion 4132 is formed as an engagement portion engaged with the solid-state light source 411. Specifically, the convex portion 4132 is inserted into the second concave portion 4113 of the stem 4111, and through this, the position of the solid-state light source 411 is determined in the opening 4131. That is, the opening 4131 and the convex portion 4132 function as a position determination unit.

Configuration of Pressing Member

Referring again to FIG. 3, the pressing member 414 presses the solid-state light source 411 of which the terminals 4116 are inserted into the hole portions 4121 to the front portion 412A, and through this, fixes the solid-state light source 411 to the front portion 412A. The pressing member 414 is provided to cover the spacer 413 when it is mounted on the front portion 412A. The pressing member 414 is formed by a sheet-like elastic member having dimensions substantially the same as the spacer 413 in plan view, and for example, is formed by stamping a relatively thin metal plate.

In the pressing members 414, a plurality of the openings 4141 of the substantially rhombic shape in plan view are formed on positions corresponding to openings 4131 of the spacer 413 so as to penetrate through the pressing member 414 in the thickness direction (Z direction). That is, the openings 4141 are formed in a matrix shape so as to form a plurality of rows and a plurality of columns along the X direction and the Y direction depending on the positioned solid-state light sources 411 by the spacer 413. The openings 4141 are openings for transmitting the lights emitted from the solid-state light sources 411.

In opposite positions at edges of the openings 4141, a pair of projections 4142 is formed to project from the edges toward the inside of the openings 4141 as the pressing portion. The projections 4142 may be plate springs that pressingly fixes the solid-state light source 411 toward the front portion 412A in contact with the upper surface 4111A of the stem 4111 when the pressing member 414 is mounted on the base member 412.

Further, the projection directions of the projections 4142 from the edges of the openings 4141 are the same in the respective openings 4141, but these directions are inclined with respect to the X direction that is the row direction of the solid-state light source 411 and the Y direction that is the column direction thereof. In this embodiment, these inclination angles are set to 45 degrees with respect to the X direction and the Y direction. Since each of the projections 4142 is positioned in the gap between the solid-state light sources 411 through this configuration, the projections 4142 can be reliably in contact with the solid-state light sources 411 even if the solid-state light sources 411 are densely arranged. Accordingly, the pressing forces of the front portions 412A can reliably act on the solid-state light sources 411.

Here, the respective projections 4142 are elastically deformed when the stem 4111 is pressed since the pressing member 414 is formed by the elastic member. However, in this embodiment, the projection 4142 presses the stem 4111 using the plastic region rather than the elastic region. This is due to the following reasons.

The first reason is that in order to ensure the pressing force (spring force) to pressingly fix the solid-state light sources 411 in the case of using the elastic region, it is necessary to increase the projection dimension of the projection 4142. For this, by using the plastic region in which the spring force is great rather than the elastic region in which the spring force is small, the projection dimension thereof can be reduced, and thus the openings 4141, and further, the solid-state light sources 411 can be densely arranged.

The second reason is that although the projections 4142 are deformed in the plastic region, the change of the spring force applied to the stem 4111 with respect to the displacement amount of the projections 4142 becomes small. That is, if variations occur in dimensions (dimensions in Z direction) in the thickness direction of the stem 4111 due to individual differences in the solid-state light sources 411, the displacement amount of the projections 4142 that are in contact with the upper surface 4111A varies. However, even if the displacement amount of the projections 4142 varies, the change of the spring force applied to the stem 4111 is small, and thus the spring forces (pressing forces) with respect to the respective solid-state light sources 411 can be substantially uniformized. Further, since the removal of the pressing member 414 from the base member 412 is not frequently done even if the projections 4142 are plastically deformed, a major problem may not occur even if the deformation of the projections 4142 remains.

Further, the projection 4142 is formed in a substantially trapezoidal shape in plan view in which the width dimension becomes smaller as the projection 4142 is directed from the edge of the opening 4141 to the inside of the opening 4141. In other words, the respective projections 4142 are formed so that the width dimension on the edge side of the opening 4141 becomes large and the width dimension becomes smaller toward the center of the opening 4141 from the edge thereof. Because of this, when the projections 4142 press the solid-state light source 411, a large load applied to an area in the vicinity of the edge of the opening 4141 can be dispersed in the projections 4142. Accordingly, damage to the projections 4142 can be suppressed.

Configuration of Fixing Member

The fixing member 415 is formed of rigid metal in a rectangular shape having dimensions substantially the same as the spacer 413 and the pressing member 414 in plan view. This fixing member 415 is screw-fixed to the front portion 412A in a state where the spacer 413 and the pressing member 414 are placed between the fixing member 415 and the front portion 412A, and thus fixes the spacer 413 and the pressing member 414 to the front portion 412A.

The fixing member 415 has a plurality of rhombic-shaped openings 4151 in plan view in positions in accordance with the opening 4131 and the opening 4141. These openings 4151 are formed in a matrix shape so as to form a plurality of rows and a plurality of columns along the X direction and the Y direction depending on the arrangement of the solid-state light sources 411. Through the openings 4151, the lights from the solid-state light sources 411 arranged on the base member 412 are emitted to the outside of the light source unit 41.

Fixing of Solid-state Light Source

Figure 6:
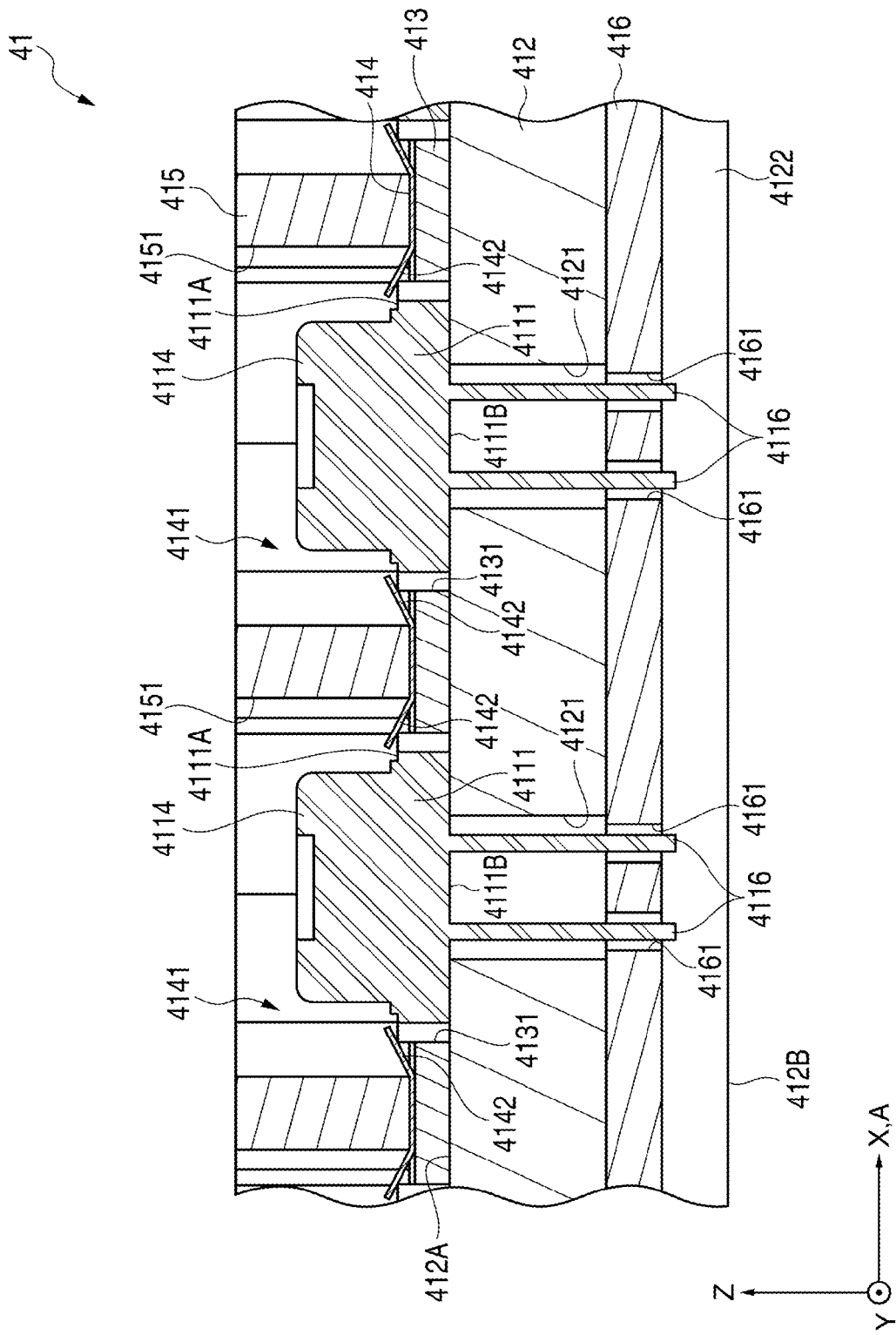
FIG. 6 is a cross-sectional view illustrating apart of a light source unit according to the first embodiment.

FIG. 6 is a cross-sectional view illustrating the light source unit 41.

Here, the fixing of the solid-state light sources 411 to the base member 412 will be described.

First, the spacer 413 is arranged on the front portion 412A, and a pair of terminals 4116 are inserted into the hole portions 4121, so that the solid-state light sources 411 are arranged in the respective openings 4131 of the spacer 413. At this time, the respective solid-state light sources 411 are arranged so that the convex portions 4132 are inserted into the second concave portions 4113 of the stems 4111. Through this, the position of the solid-state light source 411 is determined on the front portion 412A. In this state, the X direction which is the row direction of the respective hole portions 4121 and is also the major axis direction of the hole portions 4121 coincides with the Direction A that is the direction connecting a pair of terminals 4116.

Next, the pressing member 414 is arranged to cover the spacer 413. In this state, the projections 4142 formed at the edges of the respective openings 4141 of the pressing member 414 are in contact with an area where the first concave portion 4112 and the second concave portion 4113 are not formed on the upper surface 4111A of the stem 4111.

Then, after the fixing member 415 is arranged to cover the pressing member 414, screws that penetrate through the spacer 413, the pressing member 414, and the fixing member 415 are fixed to the base member 412. Through this, as shown in FIG. 6, the solid-state light source 411, the spacer 413, the pressing member 414, and the fixing member 415 are fixed to the base member 412. In this state, by the projections 4142 of the pressing member 414, the respective solid-state light sources 411 are pressed toward the planar front portion 412A, and the bottom surface 4111B of the stem 4111 and the front portion 412A are in surface contact with each other.

Thereafter, the terminals 4116 exposed to the side of the rear portion 412B are connected to the respective substrates 416, and the respective substrates 416 are received in the groove portions 4122. Further, the heat dissipation member 417 is mounted on the rear portion 412B. In the above-described order, the light source unit 41 is assembled.

The projector 1 according to this embodiment as described above has the following effects.

The solid-state light source 411 arranged on the front portion 412A as the arrangement surface is pressed by the projection 4142 as the pressing portion of the pressing member 414, and is fixed to the front portion 412A. Through this, the mounting of the solid-state light source 411 on the base member 412 can be easily performed as compared with a case where the solid-state light source 411 is fixed to the base member 412 by laser spot welding. Accordingly, the solid-state light source 411 can be easily arranged.

Further, through removing of the fixing member 415 and the pressing member 414 from the base member 412, the solid-state light source 411 can also be removed from the base member 412. Accordingly, the solid-state light source 411 in which a problem has occurred can be replaced, and thus the maintenance properties of the first light source device 4 and further the projector 1 can be improved.

Further, since the bottom surface 4111A of the stem 4111 is pressingly fixed in a state where it is in contact with the planar-shaped front portion 412A, it is possible to easily make the directions of the respective solid-state light sources 411 coincide with each other. Accordingly, the directions of the lights emitted from the respective solid-state light sources 411 can be easily adjusted, and thus the efforts to finely adjust the direction of the optical axis of the parallelization lens 418 with respect to the center axes of the lights from the respective solid-state light sources 411 can be reduced.

Since the opening 4141, through which the light emitted from the solid-state light source 411 that is pressed by the pressing member 414 is transmitted, is formed on the pressing member 414, the light path of the light that is emitted from the solid-state light source 411 to the first light source device 4 can be ensured.

Further, the projection 4142 projects from the edge of the opening 4141 to the inside of the opening 4141. Through this, the projection 4142 and the opening 4141 can be easily formed by press working or the like against the pressing member 414, and the projection 4142 can reliably be in contact with the solid-state light source 411 (specifically, the upper surface 4111A thereof) that is positioned inside the opening 4141. Accordingly, the pressing force can reliably act onto the solid-state light source 411.

The projection 4142 is formed in a substantially trapezoidal shape in plan view in which the width dimension becomes smaller as the projection 4142 is directed from the edge of the opening 4141 to the inside of the opening 4141. Through this, the great load that is applied to the area in the vicinity of the edge of the opening 4141 can be dispersed when the projection 4142 presses the solid-state light source 411. Accordingly, the damage to the projection 4142 can be suppressed, and thus the pressing force can reliably act on the solid-state light source 411.

The solid-state light sources 411 are arranged in a matrix shape so as to form a plurality of rows and a plurality of columns along the X direction and the Y direction, and the projection direction of the projections 4142 from the edge of the opening 4141 is the direction that is inclined with respect to the X direction and the Y direction (direction inclined by 45 degrees in plan view). Through this, the projections 4142 can be arranged in the area in which a large gap is formed in the vicinity of the respective solid-state light sources 411, and thus, the respective solid-state light sources 411 can be reliably pressingly fixed to the base member 412 even if the respective solid-state light sources 411 are densely arranged. Accordingly, the miniaturization of the first light source device 4 and further the projector 1 can be attained.

The positions of the respective solid-state light sources 411 arranged on the front portion 412A are determined by the respective openings 4131 and convex portions 4132 of the spacer 413 provided between the base member 412 and the pressing member 414. Through this, the positional accuracy of the solid-state light sources 411 in the front portion 412A can be improved.

Further, by the fixing member 415 provided to cover the pressing member 414, the pressing member 414 is fixed to the base member 412. Through this, since the pressing member 414 can be stably fixed to the base member 412, the pressing force can stably act on the solid-state light sources 411, and the arrangement of the solid-state light sources 411 can be stabilized.

The plurality of solid-state light sources 411 on the front portion 412A are pressed by one pressing member 414. Through this, the fixing work of the solid-state light sources 411 can be simplified as compared with the case where the solid-state light sources 411 are individually pressingly fixed by the corresponding pressing members. Accordingly, the increase of the number of components can be suppressed, and the process of manufacturing the first light source device 4 can be simplified.

Modification of First Embodiment

Figure 7:
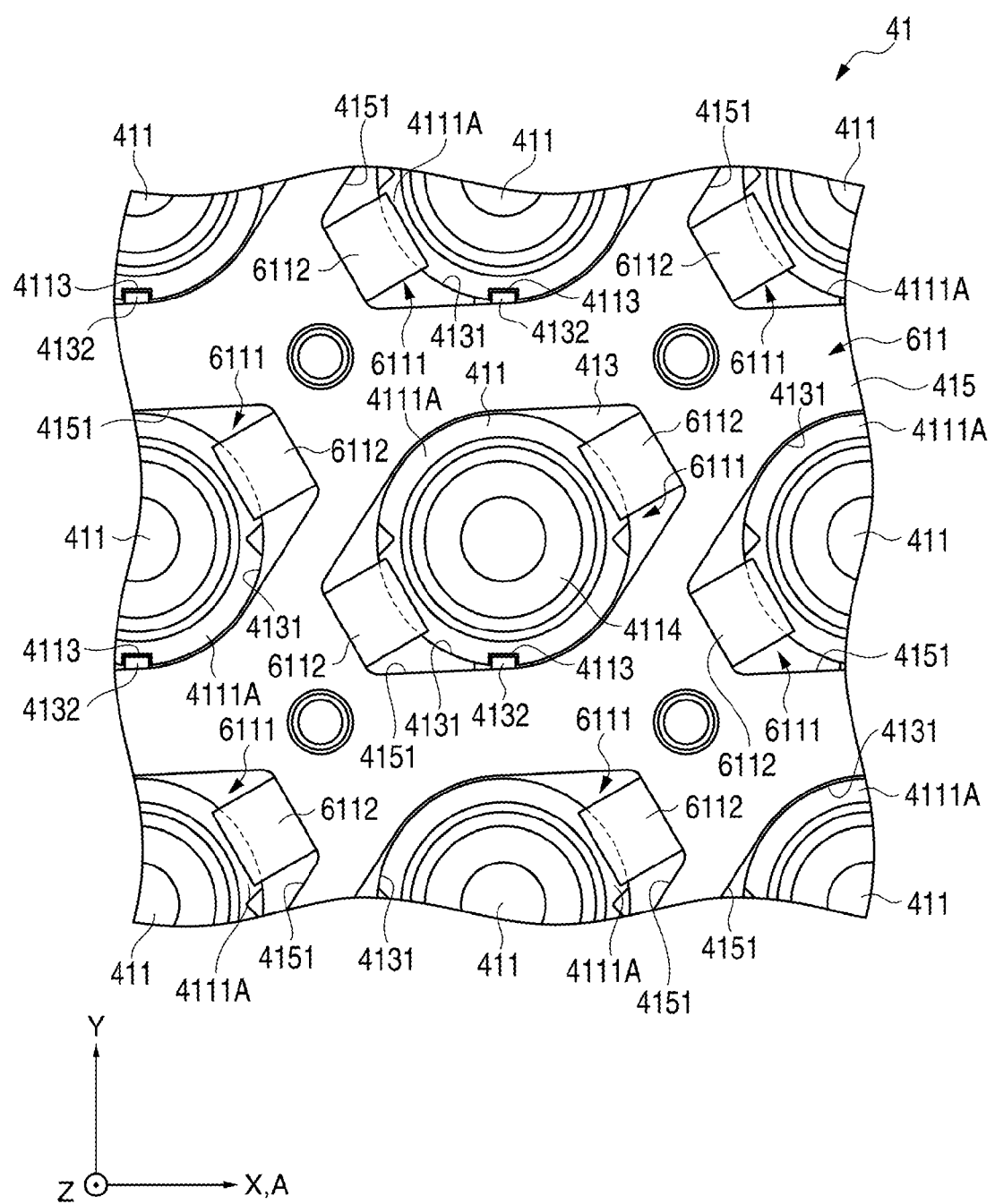
FIG. 7 is a plan view illustrating a part of a light source unit according to a modification of the first embodiment.

FIG. 7 is a view illustrating a modification of the pressing member 414 according to this embodiment.

In this embodiment, it is described that the respective projections 4142 of the pressing member 414 are formed in a substantially trapezoidal shape in plan view in which the width dimension becomes smaller as the projections of the pressing member 414 is directed to the center of the opening 4141. However, instead of the pressing member 414, a pressing member 611 of which the respective projections 6112 are formed in a rectangular shape in plan view can be used.

This pressing member 611, as shown in FIG. 7, has the same configuration and function as the above-described pressing member 414 except that the pressing member 611 has the rectangular-shaped projections 6112 in plan view instead of the projections 4142 of the substantially trapezoidal shape. That is, the pressing member 611 has the opening 6111 that is the same as the opening 4141, and a pair of projections 6112 of a rectangular shape in plan view formed on the edge of the opening 6111.

The projections 6112 pressingly fixes the solid-state light sources 411 to the front portion 412A in contact with the upper surface 4111A of the stem 4111 positioned inside the opening 4131 when the spacer 413 and the pressing member 611 are mounted on the front portion 412A by the fixing member 415 and the screws.

Even in the case of adopting such a pressing member 611, the same effect as the above-described projector 1 can be achieved. Further, on the point that the processing of the rectangular-shaped projections 6112 in a plan view is relatively easy, the manufacturing of the pressing member 611 can be easily performed as compared with the pressing member 414 having the trapezoidal-shaped projections 4142, and thus the manufacturing cost of the pressing member 611, and further, the first light source device 4, can be reduced.

Second Embodiment

Hereinafter, a second embodiment of the invention will be described.

Although the projector according to this embodiment has the same configuration and function as the above-described projector 1, it differs from the projector 1 on the point that each of the respective solid-state light sources 411 is pressingly fixed to the base member 412 by one pressing member.

In the following description, the same reference numerals are given to portions that are the same as or substantially the same as the above-described portions and the description thereof will not be repeated.

Figure 8:
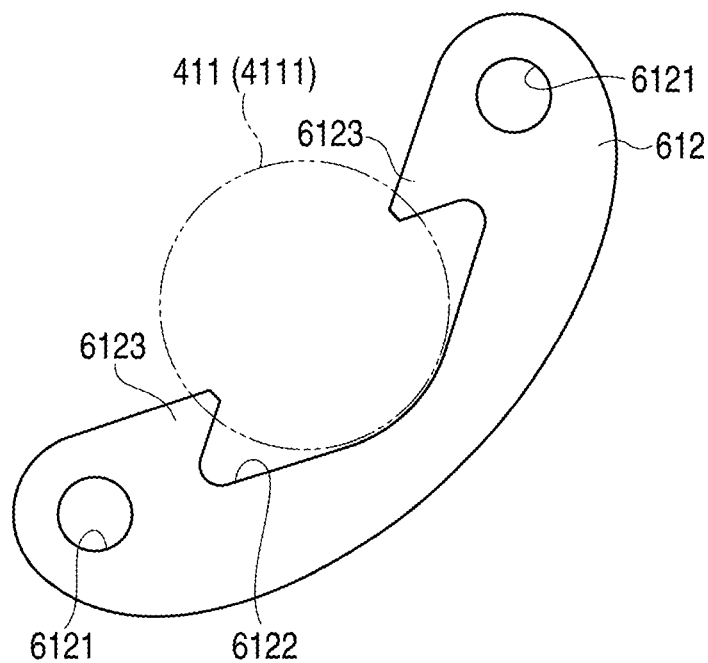
FIG. 8 is a plan view illustrating a pressing member of a projector according to a second embodiment of the invention.

FIG. 8 is a plan view illustrating a pressing member 612 of a projector according to this embodiment.

The projector according to this embodiment has the same configuration and function as the projector 1 except that a plurality of pressing members 612 are provided instead of the pressing member 414 and the fixing member 415.

As shown in FIG. 8, the pressing members 612 is substantially "U"-shaped in plan view, and mounting members such as screws mounted on the spacer 413 are inserted into and pass through hole portions 6121 which are formed on the pressing members 612 and have both ends of an arc shape. Further, inside the respective hole portions 6121 on the pressing member 612, an opening 6122 for ensuring a path of light that is emitted from the solid-state light source 411 pressed by the pressing member 612 is formed, and a pair of projections 6123 are formed in positions face each other at the edge of the opening 6122.

The respective projections 6123 are formed to project from the edge of the opening 6122 to the center of the opening 6122 in the opposite direction. The projections 6123 are in contact with the upper surface 4111A of the solid-state light sources 411 arranged in the opening 4131 when the pressing member 612 is mounted on the spacer 413, and pressingly fix the solid-state light sources 411 to the front portion 412A.

In this embodiment, the projection 6123 is formed in a substantially trapezoidal shape in plan view in which the width dimension becomes smaller as the projection 6123 projects from the edge of the opening 6122. Because of this, in the same manner as the above-described projections 4142, a load applied to an area on the edge side in the projection direction (area in the vicinity of the edge of the opening 6122) can be dispersed. Further, the projection 6123 may be formed in a rectangular shape in plan view, as in the above-described projection 6112.

When the pressing member 612 is mounted on the spacer 413, in the same manner as the pair of projections 4142 as described above, the projection direction of the projection 6123 from the edge of the opening 6122 crosses the X direction that is the row direction and the Y direction that is the column direction. Because of this, even if the solid-state light sources 411 are densely arranged on the front portion 412A, the pressing member 612 is arranged in the gap between the solid-state light sources 411, and the solid-state light sources 411 can be pressing fixed to the front portion 412A by the respective projections 6123.

According to the projector according to this embodiment as described above, the following effects can be achieved in addition to the same effects as the above-described projector 1.

That is, since the respective solid-state light sources 411 are individually press-fixed by the plurality of pressing members 612, even though a problem occurs in any one of the respective solid-state light sources 411, the corresponding solid-state light source 411 in which the problem has occurred can be individually taken off from the base member 412 and the spacer 413 to be replaced. Accordingly, the replacement work of the solid-state light sources 411 can be easily performed.

Third Embodiment

Next, the third embodiment of the invention will be described.

The projector according to this embodiment has the same configuration and function as the above-described projector 1. Here, it is described that according to the projector 1, the extension direction of the projection 4142 from the edge of the opening 4141 in the pressing member 414 crosses the row direction and the column direction, which are the X direction and the Y direction. In the projector according to this embodiment, the extension direction is parallel to the row direction. On this point, the projector according to this embodiment is different from the projector 1. In the following description, the same reference numerals are given to portions that are the same as or substantially the same as the above-described portions and the description thereof will not be repeated.

Figure 9:
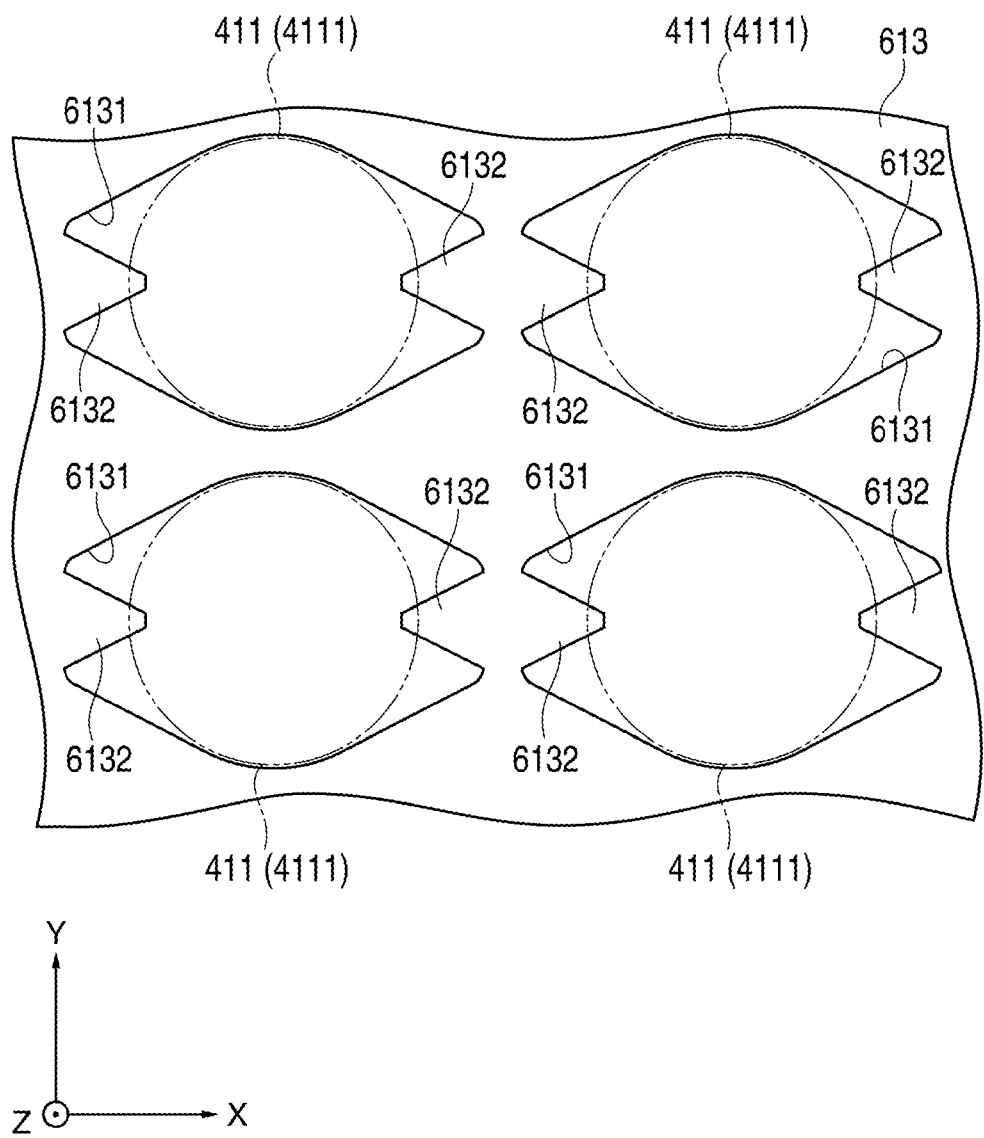
FIG. 9 is a plan view illustrating a pressing member of a projector according to a third embodiment of the invention.

FIG. 9 is a plan view illustrating a pressing member 613 of a projector according to this embodiment.

The projector according to this embodiment has the same configuration and function as the projector 1 except that the pressing member 613 is provided instead of the pressing member 414.

As shown in FIG. 9, the pressing member 613 has a plurality of rhombic-shaped openings 6131 in plan view which are arranged in a matrix shape so as to form a plurality of rows and a plurality of columns along the X direction and the Y direction. In the opposite positions at the edges of the openings 6131, projections 6132 are formed as a pressing unit which extends from the edge to the direction close to each other.

In the same manner as the above-described projections 4142, the projections 6132 apply a pressing force (spring force) in contact with the upper surface 4111A of the solid-state light source 411 positioned inside the opening 4131 of the spacer 413 when the projections 6132 are fixed to the front portion 412A by the fixing member 415 and the screws (not illustrated) in a state where the spacer 413 is placed between the base member 412 and the front portion 412A, and pressingly fix the front portion 412A of the solid-state light source 411. Although the projections 6132 is formed in a substantially trapezoidal shape in plan view in which the width dimension becomes smaller as the projection 6132 is directed to the center of the opening 6131, they may be formed in a rectangular shape in plan view, as in the above-described projection 6112.

Further, in this embodiment, the hole portion 4121 in the base member 412 and the openings 4131 and 4151 in the spacer 413 and the fixing member 415 are formed depending on the forming position of the opening 6131 of the pressing member 613.

In this embodiment, the projection direction from the edge of the opening 6131 of the projection 6132 is the X direction that is the row direction of the arrangement directions of the solid-state light sources 411. Because of this, the pitch between the solid-state light sources 411 in the X direction in the case where the pressing member 613 is adopted, as shown in FIG. 5, is larger than the pitch in the case where the pressing member 414 is adopted, but is smaller than the pitch in the Y direction in the case where the pressing member 414 is adopted. Because of this, in the case where the pressing member 613 is adopted, the solid-state light sources 411 can be densely arranged in the Y direction as compared with the case where the pressing member 414 is adopted.

According to the projector according to this embodiment as described above, the same effects as the above-described projector 1 can be achieved.

Modification of the Third Embodiment

In the above-described pressing member 613, the openings 6131 are formed in a matrix shape so as to form a plurality of rows and a plurality of columns along the X direction and the Y direction. However, in two rows of the openings adjacent to each other, the center position of the openings that constitute one row and the center position of the openings that constitute the other row may have been shifted. That is, the center position of the opening adjacent to a certain opening in the Y direction may pass through the center of the opening or may not be on a straight line.

Figure 10:
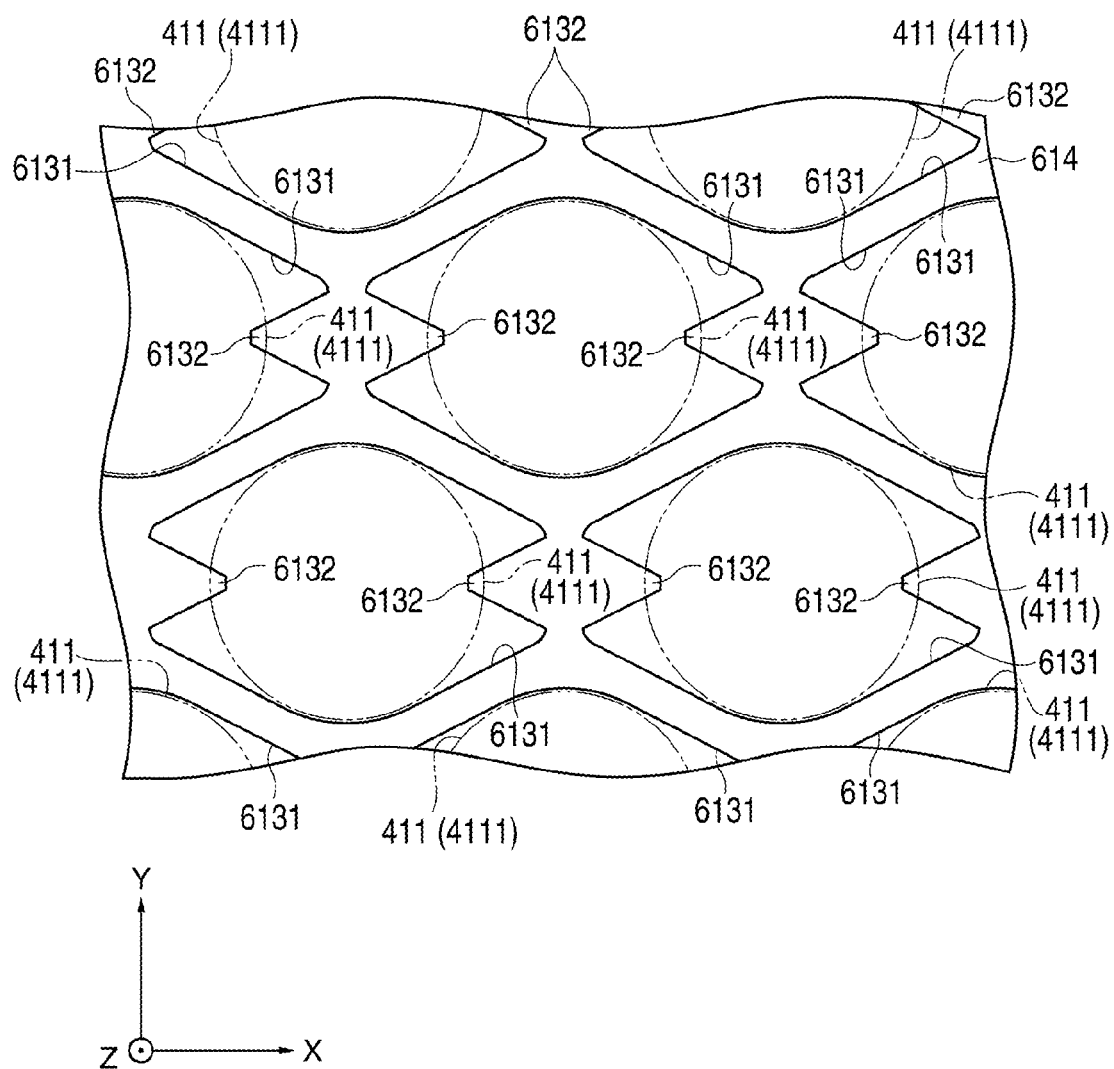
FIG. 10 is a plan view illustrating a pressing member according to a modification of the third embodiment.

FIG. 10 is a plan view illustrating a pressing member 614 that is a modification of the pressing member 613 according to this embodiment.

For example, according to the pressing member 614 that is a modification of the pressing member 613, as shown in FIG. 10, the above-described openings 6131 are provided so as to form a plurality of rows and a plurality of columns along the X direction and the Y direction, and at the edge of the opening 6131, a pair of projections 6132 are formed.

One row of two adjacent rows and the other row among the plurality of rows formed by the openings 6131, the center positions of the respective openings 6131 have been shifted with respect to the X direction.

Specifically, although the pitches between the openings 6131 along the X direction in the respective rows are the same, the openings 6131 constituting the other row are respectively positioned in the positions on the straight line along the Y direction after passing through the intermediate position of the adjacent openings 6131 in the one row.

By arranging the openings 6131 as described above, the pitch between the openings 6131 along the Y direction can be shortened as compared with the above-described pressing member 613. Accordingly, the solid-state light sources 411 can be arranged more densely on the front portion 412A.

Fourth Embodiment

Next, a fourth embodiment of the invention will be described.

A projector of this embodiment has the same configuration and function as the above-described projector 1. While the pressing member 414 in the projector 1 has a pair of projections 4142, a pressing member in the projector of this embodiment has three projections arranged at regular intervals at the edge of an opening. From this point, the projector of this embodiment is different from the projector 1. Note that, in the following description, the same or substantially same parts as the parts described above are represented by the same reference numerals, and description thereof will not be repeated.

Figure 11:
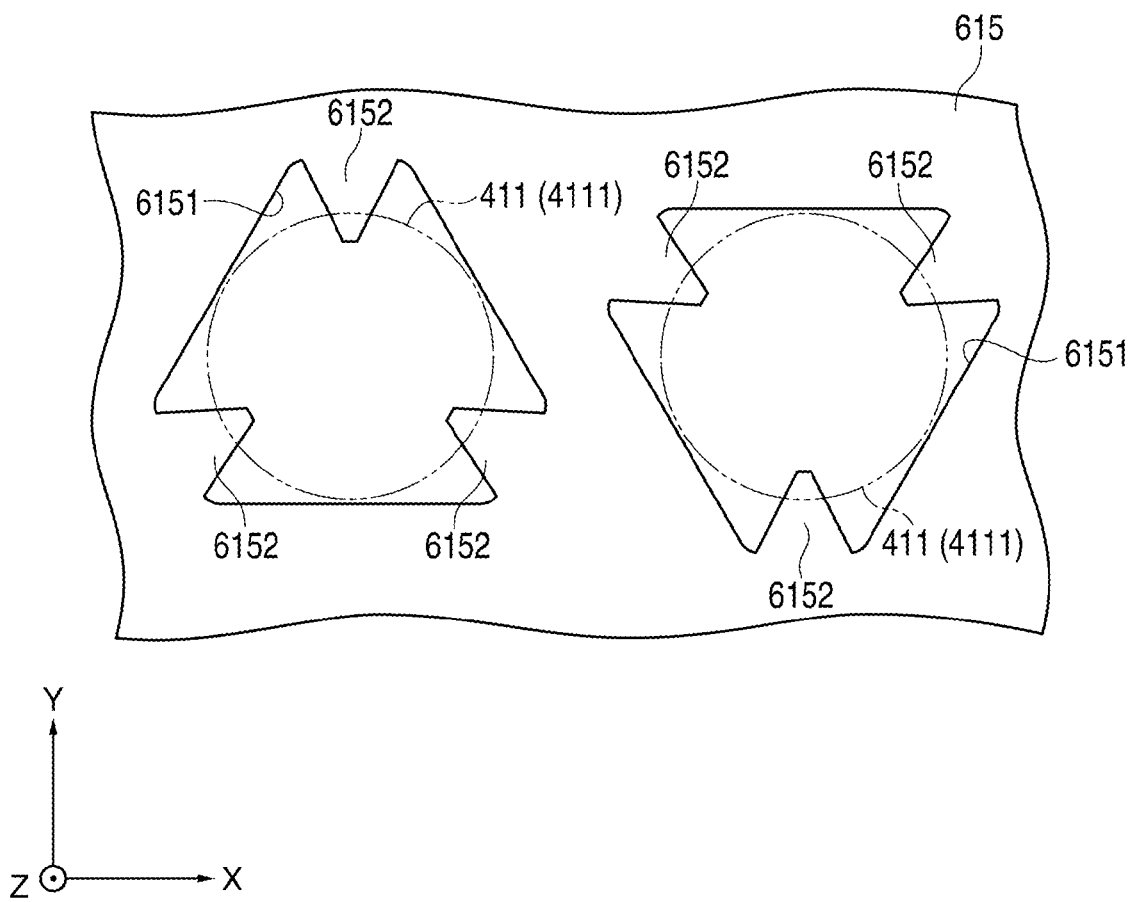
FIG. 11 is a plan view illustrating a pressing member of a projector according to a fourth embodiment of the invention.

FIG. 11 is a plan view illustrating a pressing member 615 in the projector of this embodiment.

The projector of this embodiment has the same configuration and function of the above-described projector 1, except that the pressing member 615 is provided instead of the pressing member 414.

As shown in FIG. 11, the pressing member 615 has a plurality of openings 6151 substantially having a triangular shape in plan view formed at a position corresponding to a hole portion 4121 of a base member 412 and an opening 4131 of a spacer 413. That is, the openings 6151 are arranged in a matrix shape having a plurality of rows and a plurality of columns in the X direction and the Y direction.

The openings 6151 are formed in the X direction and the Y direction such that the triangles are reversed. Accordingly, solid-state light sources 411 can be arranged densely on a front portion 412A.

The hole portion 4121 of the base member 412, the opening 4131 of the spacer 413, and the opening 4151 of the fixing member 415 which are used in this embodiment are formed at a position corresponding to the opening 6151. The opening 4151 is substantially formed to have the same shape as the corresponding opening 6151. For this reason, the opening 4151 is formed to have a substantially triangular shape in plan view.

In the vertex portions of the triangle at the edge of each opening 6151, projections 6152 each of which projects toward the center of the opening 6151 are formed. That is, the projections 6152 are arranged at regular intervals at the edge of the opening 6151. When the pressing member 615 is fixed to the front portion 412A by the fixing member 415 and screws in a state where the spacer 413 is sandwiched between the pressing member 615 and the front portion 412A of the base member 412, the projections 6152 come into contact with the upper surface 4111A of the solid-state light source 411 positioned in the opening 4131 of the spacer 413, and pressingly fixes the solid-state light source 411 to the front portion 412A.

In this embodiment, each projection 6152 is formed to have a substantially trapezoidal shape in plan view in which the width dimension decreases as projecting from the edge of the opening 6151. Accordingly, it is possible to disperse the load of a region of each projection 6152 at the edge of the opening 6151, thereby suppressing damage to each projection 6152. However, the invention is not limited thereto, and as in the above-described projections 6112, the projections may be formed to have a substantially rectangular shape in plan view.

According to the projector having the pressing member 615, not only the same effects as the above-described projector 1 but also the following effects can be obtained.

That is, the pressing force (spring force) which presses the solid-state light source 411 to the front portion 412A can be dispersed using the projections 6152 and act on the upper surface 4111A. For this reason, since the pressing force which acts using the projections 6152 is reduced compared to a case where a pair of projections are provided, it is possible to reduce the amount of projection of each projection 6152 from the edge of the opening 6151. Therefore, it is possible to arrange the solid-state light sources 411 more densely and also to further reduce the size of the light source unit 41.

It is possible to reduce the load applied to each projection 6152, thereby suppressing damage to each projection 6152 compared to a case where two projections are formed.

The solid-state light source 411 is pressed by the projections 6152 arranged at regular intervals at the edge of the opening 6151, thereby more stably fixing the solid-state light source 411 compared to a case where the solid-state light source is pressingly fixed using two projections.

Modification of Fourth Embodiment

Figure 12:
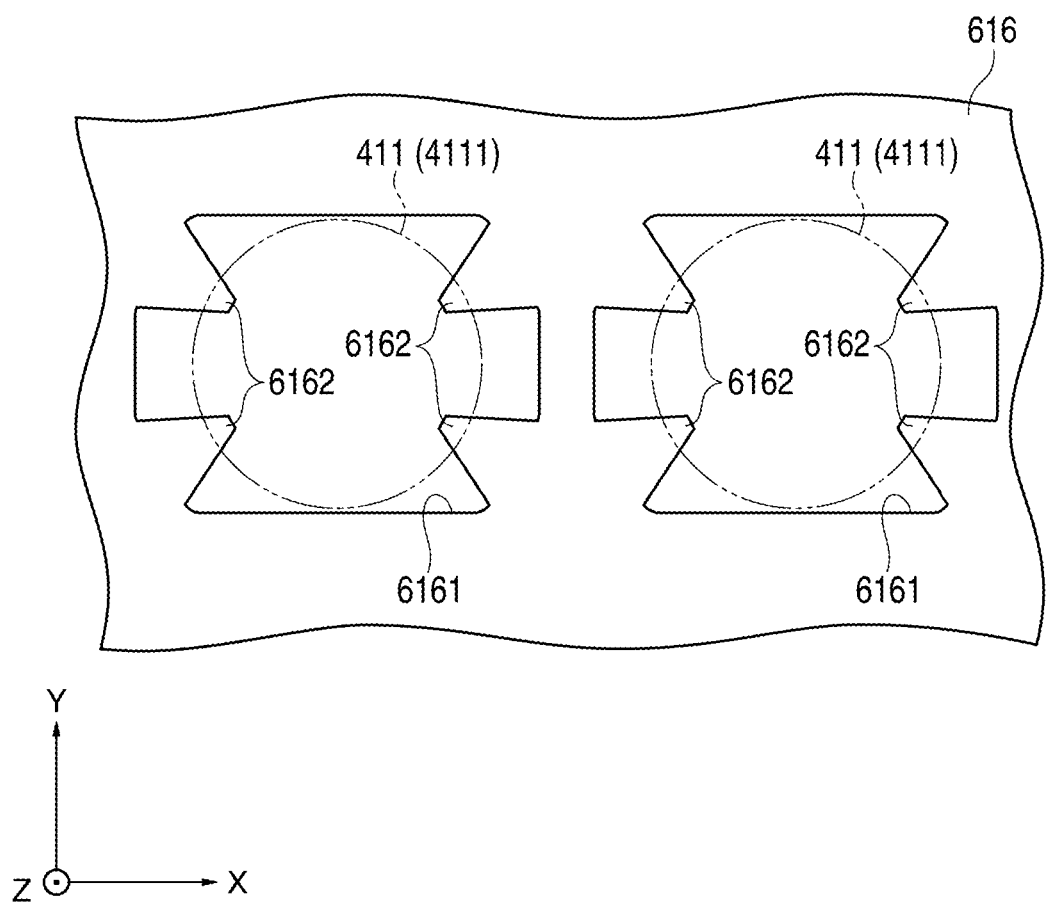
FIG. 12 is a plan view illustrating a pressing member according to a modification of the fourth embodiment.

FIG. 12 is a plan view showing a pressing member 616 which is a modification of the pressing member 615 of this embodiment.

The number of projections of the pressing member which presses and fixes the solid-state light source 411 to the front portion 412A may be two as in the above-described pressing member 414, may be three as in the above-described pressing member 615, or may be four or more.

For example, the pressing member 616 shown in FIG. 12 has openings 6161 having a substantially rectangular shape in plan view arranged in a matrix shape having a plurality of rows and a plurality of columns in the X direction and the Y direction.

In the vertex portions at the edge of each opening 6161, four projections 6162 which are pressing portions projecting toward the center of the opening 6161 are formed in total.

Similarly to the above-described projections 6152, when the pressing member 615 is fixed to the front portion 412A by the fixing member 415 and screws in a state where the spacer 413 is sandwiched between the pressing member 615 and the front portion 412A of the base member 412, these projections 6162 come into contact with the upper surface 4111A to press and fixe the solid-state light source 411 to the front portion 412A.

Even when the pressing member 616 is used, the same effects as when the pressing member 615 is used can be obtained.

Similarly to the projections 6152, the projections 6162 are formed to have a substantially trapezoidal shape in plan view in which the width dimension decreases with projecting from the edge of the opening 6161. However, the invention is not limited thereto, and the projections may be formed to have a rectangular shape in plan view.

Fifth Embodiment

Next, a fifth embodiment of the invention will be described.

A projector of this embodiment has the same configuration and function as the above-described projector 1. In the light source unit 41 of the projector 1, in a state where a spacer 413, a pressing member 414, and a fixing member 415 are laminated on a base member 412, the members 413 to 415 are fixed to a front portion 412A by screws which pass through these members 413 to 415. In contrast, in the light source unit of the projector of this embodiment, the pressing member is fixed directly to the front portion 412A. From this point, the projector of this embodiment is different from the projector 1. Note that, in the following description, the same or substantially same parts as the parts described above are represented by the same reference numerals, and description thereof will not be repeated.

Figure 13:
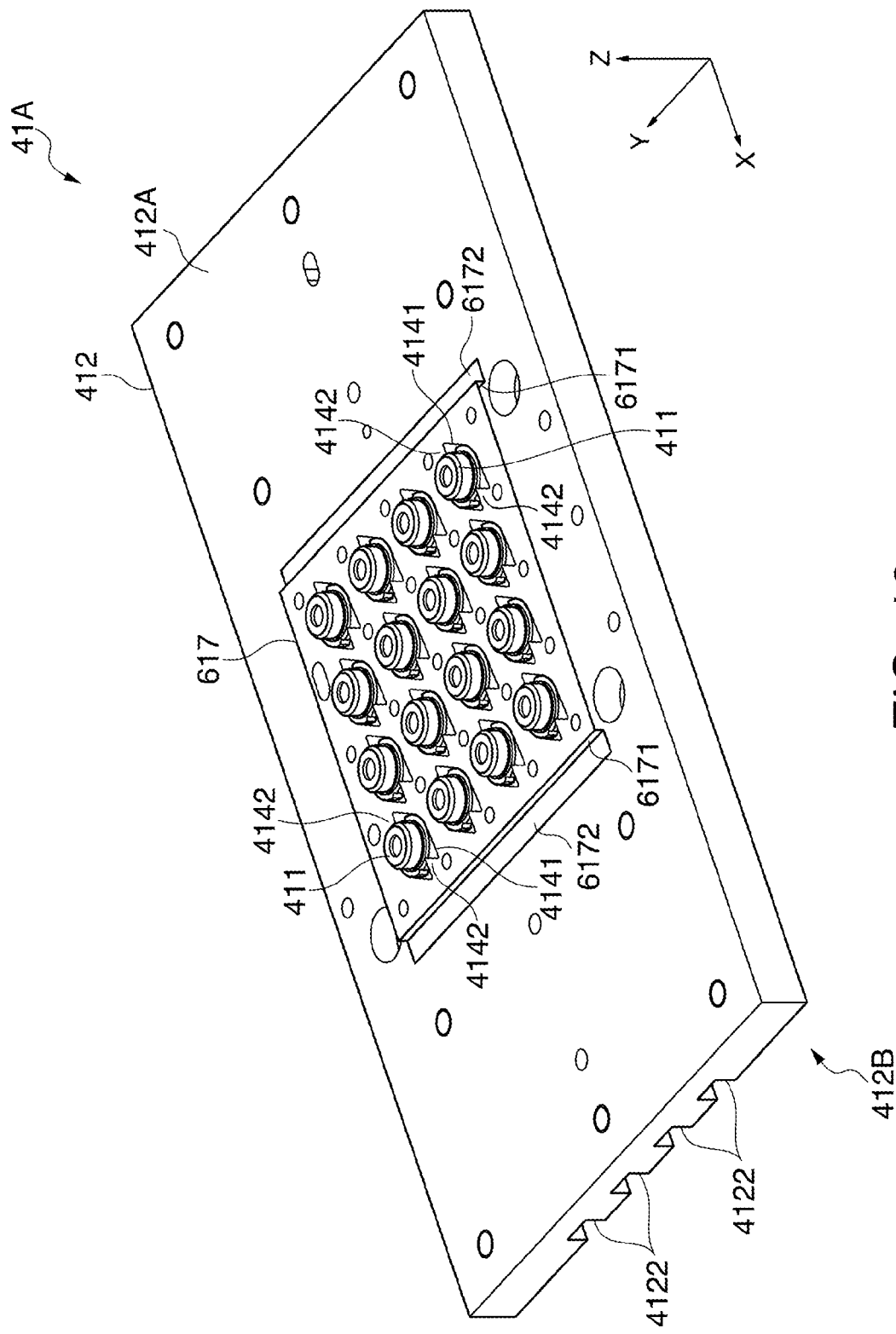
FIG. 13 is a perspective view illustrating a light source unit of a projector according to a fifth embodiment of the invention.

FIG. 13 is a perspective view showing a light source unit 41A of the projector of this embodiment.

The projector of this embodiment has the same configuration and function as the projector 1, except that a light source unit 41A is provided instead of the light source unit 41.

Similarly to the light source unit 41, the light source unit 41A emits light toward each reflection mirror 42. As shown in FIG. 13, the light source unit 41A has a plurality of solid-state light sources 411, a base member 412, a pressing member 617, a substrate 416, and a heat dissipation member 417, and a parallelization lens 418 (not illustrated).

Similarly to the pressing member 414, when the pressing member 617 is attached to the front portion 412A of the base member 412, the pressing member 617 pressingly fixes each solid-state light source 411 arranged on the front portion 412A to the front portion 412A. The pressing member 617 has a plurality of openings 4141 arranged in a matrix shape having a plurality of rows and a plurality of columns in the X direction and the Y direction, and a pair of projections 4142 which are pressing portions projecting from the edge of each opening 4141 inward of the opening 4141. As described above, each opening 4141 is formed at a position corresponding to the hole portion 4121.

The pressing member 617 has a pair of bent portions 6171 which are bent from both ends in the X direction in an opposite direction to the Z direction, and a pair of fixing portions 6172 which extend in the X direction from the front ends of the bent portions 6171 to be away from each other.

Of these, though not illustrated, hole portions into which screws for fixing the pressing member 617 to the front portion 412A are inserted are formed in each fixing portion 6172.

The dimension of each bent portion 6171 in the Z direction is substantially the same as the dimension of the above-described spacer 413 in the Z direction. In other words, the dimension of each bent portion 6171 in the Z direction is slightly smaller than the thickness dimension of the stem 4111 of the solid-state light source 411. For this reason, if the pressing member 617 is screwed to the front portion 412A by the fixing portions 6172, the projections 4142 are elastically deformed in a state of being in contact with the upper surface 4111A of the solid-state light source 411 to apply the pressing force (spring force) for pressing the solid-state light source 411 toward the front portion 412A on the solid-state light source 411. Accordingly, each solid-state light source 411 is pressingly fixed to the front portion 412A.

According to the projector having the pressing member 617, the same effects as the above-described projector 1 can be obtained. Since the number of components of the light source unit 41A is smaller than the light source unit 41, it is possible to reduce manufacturing costs of the light source unit 41A and to consequently reduce manufacturing costs of the projector.

Sixth Embodiment

Next, a sixth embodiment of the invention will be described.

A projector of this embodiment has the same configuration and function as the above-described projector 1. In the light source unit 41 of the projector 1, the spacer 413 is arranged on the base member 412, and the solid-state light source 411 is arranged in the opening 4131 of the spacer 413. In contrast, in a light source unit of the projector of this embodiment, a base member in which the base member 412 and the spacer 413 are formed as a single body is used instead of the base member 412 and the spacer 413. From this point, the projector of this embodiment is different from the projector 1. Note that, in the following description, the same or substantially same parts as the parts described above are represented by the same reference numerals, and description thereof will not be repeated.

Figure 14:
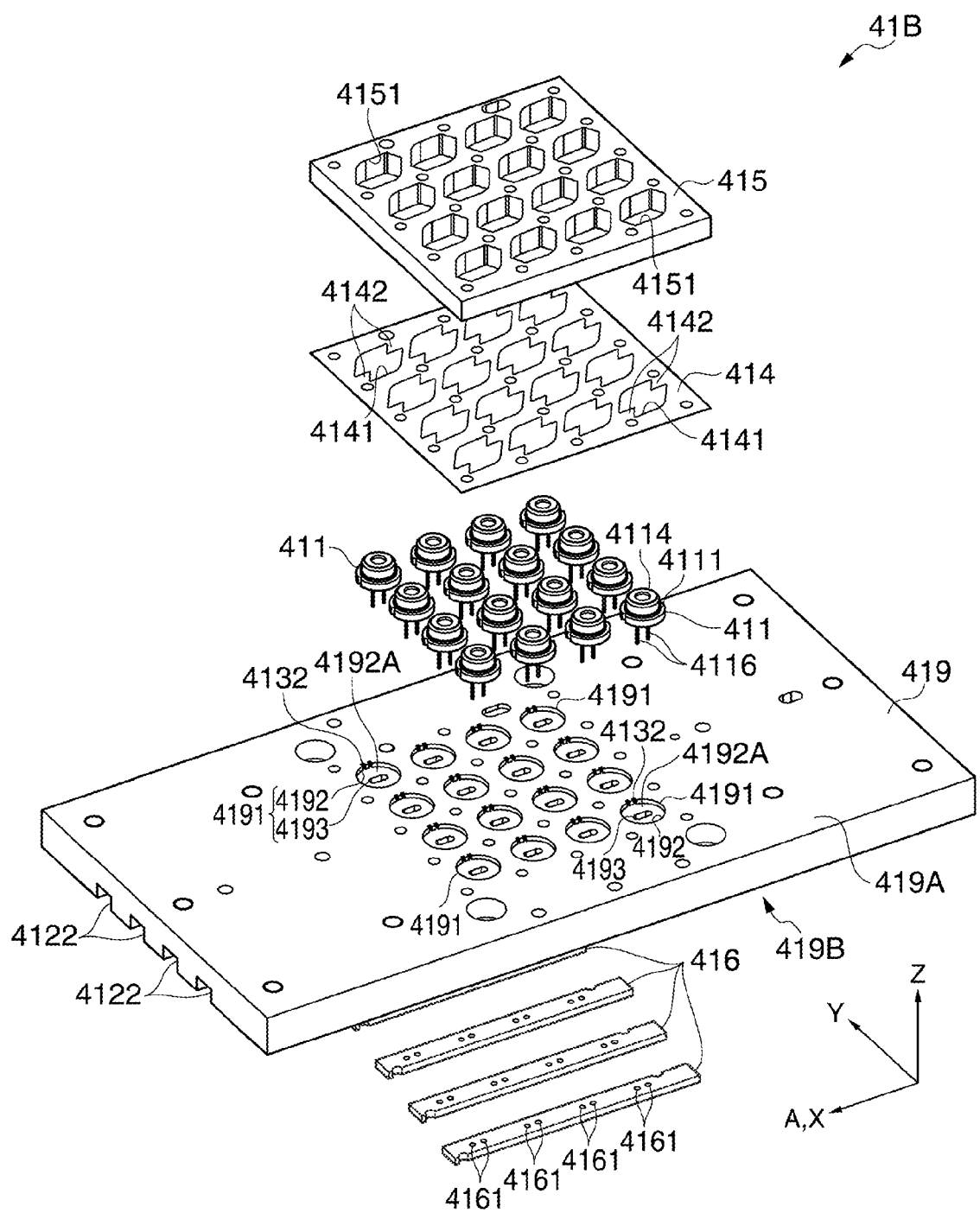
FIG. 14 is an exploded perspective view illustrating a light source unit of a projector according to a sixth embodiment of the invention.

FIG. 14 is an exploded perspective view illustrating a light source unit 41B of the projector of this embodiment. In FIG. 14, for ease of understanding, some parts are represented by reference numerals, and the parts having substantially the same shape as the parts represented by reference numerals are the same as the parts represented by reference numerals.

The projector of this embodiment has the same configuration and function as the projector 1, except that the light source unit 41B is provided instead of the light source unit 41.

Similarly to the light source unit 41, the light source unit 41B emits light toward each reflection mirror 42, and as shown in FIG. 14, has the same configuration as the light source unit 41, except that a base member 419 is provided instead of the base member 412 and the spacer 413.

The base member 419 is formed of heat conductive metal to have a substantially rectangular parallelepiped shape overall, and has a thickness dimension corresponding to the total thickness dimension (the dimension in the Z direction) of the base member 412 and the spacer 413. In a rear portion 419B of the base member 419, groove portions 4122 are formed. The base member 419 has holes to which screws for fixing a pressing member 414, a fixing member 415, and a substrate 416 or screws for fixing a heat dissipation member 417 and the like are attached, and the like.

In the base member 419, hole portions 4191 into which the solid-state light sources 411 are inserted are formed in a matrix shape having a plurality of rows and a plurality of columns. In this embodiment, 16 hole portions 4191 in total of 4 rows and 4 columns are formed.

The hole portions 4191 are formed in a back facing hole shape in which the diameter is reduced in two steps from a front portion 419A toward the rear portion 419B. Specifically, each hole portion 4191 is formed by combining a first hole portion 4192 which is positioned on the front portion 419A side and has a substantially circular shape in plan view having substantially the same diameter and depth as the opening 4131 and a second hole portion 4193 which is positioned on the rear portion 419B side and has a substantially long hole shape in plan view having substantially the same diameter and depth as the hole portion 4121.

Among them, a convex portion 4132 is formed in a partial region at the edge of the first hole portion 4192. The second hole portion 4193 is formed at the center of a planar bottom portion 4192A in the first hole portion 4192, and the major axis direction of the second hole portion 4193 is aligned with the X direction.

Figure 15:
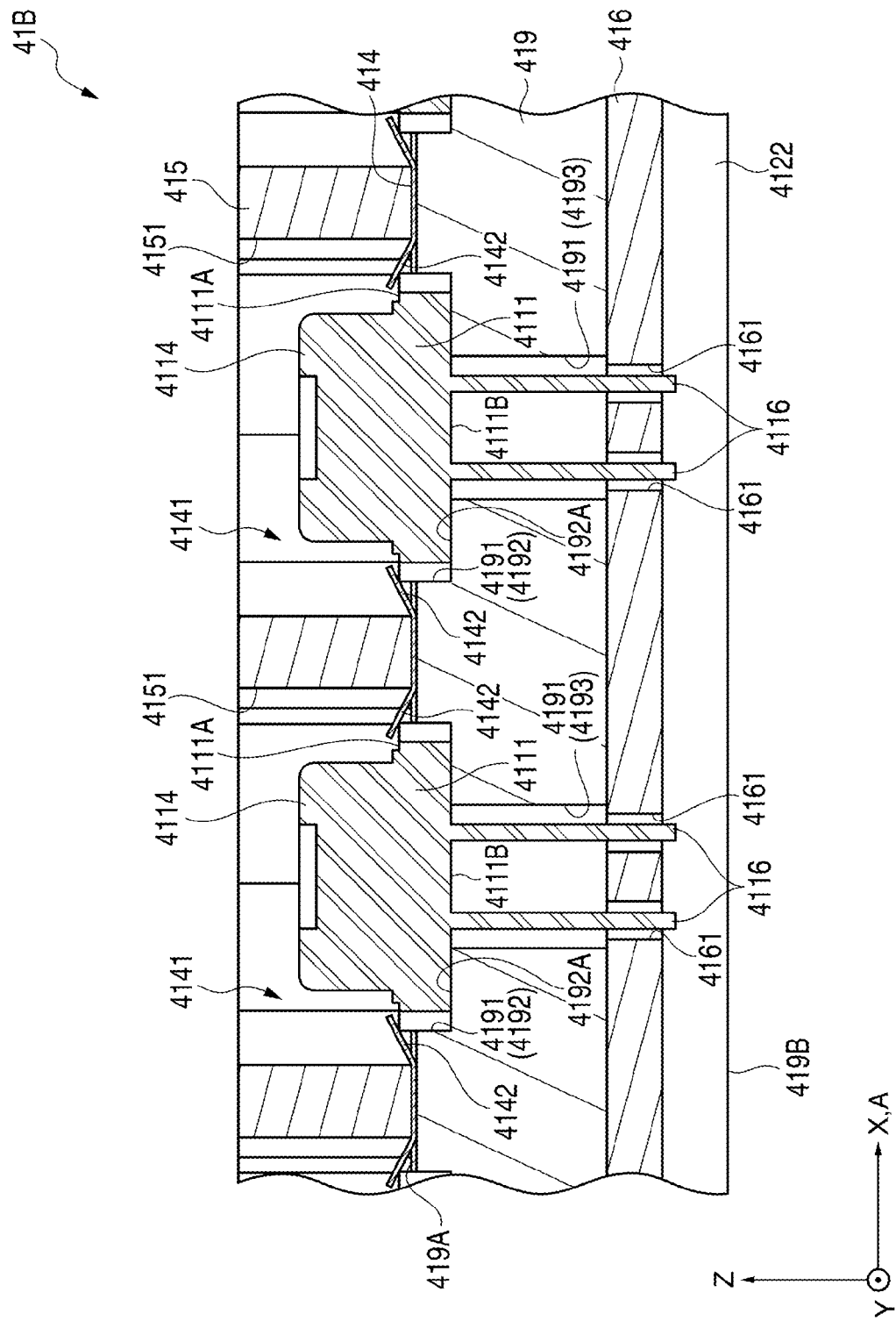
FIG. 15 is a cross-sectional view illustrating a part of the light source unit according to the sixth embodiment.

FIG. 15 is a cross-sectional view showing a part of the light source unit 41B.

When assembling the light source unit 41B, as shown in FIG. 15, first, the solid-state light source 411 is inserted into the hole portion 4191 of the base member 419. At this time, the terminals 4116 of the solid-state light source 411 are inserted into the second hole portion 4193, and the bottom surface 4111B of the stem 4111 is brought into contact with the planar bottom portion 6192A, and the convex portion 4132 is inserted into the second concave portion 4113 (see FIG. 4), such that the solid-state light source 411 is inserted into the hole portion 4191.

Next, the pressing member 414 is arranged on the front portion 419A. At this time, the pressing member 414 is arranged such that the cap 4114 of the solid-state light source 411 is positioned in the opening 4141 of the pressing member 414, and the projections 4142 formed at the edge of the opening 4141 come into contact with the upper surface 4111A of the stem 4111.

The fixing member 415 is fixed to the front portion 419A by screws or the like such that the pressing member 414 is positioned between the fixing member 415 and the front portion 419A. At this time, the pressing member 414 is positioned such that the cap 4114 is positioned in the opening 4151 of the fixing member 415. Accordingly, a region between the openings 4151 presses the pressing member 414, such that the projections 4142 in contact with the upper surface 4111A are bent, and the pressing force for pressing the solid-state light source 411 toward the front portion 419A applies to the upper surface 4111A, and the solid-state light source 411 is pressingly fixed to the base member 419.

According to the projector having the base member 419, the same effects as the above-described projector 1 can be obtained. Since the number of components of the light source unit 41B is smaller than the light source unit 41, it is possible to reduce manufacturing costs of the light source unit 41B and to consequently reduce manufacturing costs of the projector.

Although in this embodiment, the pressing member 414 is used as the pressing member which pressingly fixes the solid-state light source 411 to the base member 419, the invention is not limited thereto. Any one of the above-described pressing members 611 to 616 may be used.

Modifications of Embodiments

The invention is not limited to the foregoing embodiments, and includes, within the scope in which the object of the invention can be achieved, modifications, improvements, and the like. Further, the configuration obtained by combining the configurations in the above-described embodiments is included in the invention.

Although in the first embodiment, the solid-state light source 411 arranged on the base member 412 is pressed and fixed using the single pressing member 414, the invention is not limited thereto. That is, a plurality of pressing members 414 which press a plurality of solid-state light sources 411 may be provided. A plurality of pressing members 414 may be used in an overlapping manner.

Although in the foregoing embodiments, the solid-state light sources 411 are arranged in a matrix shape of four rows in the X direction and four columns in the Y direction, the invention is not limited thereto. That is, the number of solid-state light sources 411 and the arrangement may be appropriately changed. In this case, the forming positions of the hole portions of the base member and the openings of the spacer, the pressing member, and the fixing member and the number of hole portions or openings may be changed depending on the arrangement of the solid-state light sources 411.

Although in the foregoing first to fifth embodiments, the front portion 412A in which the stem 4111 of the solid-state light source 411 is positioned is formed to have a planar shape, the invention is not limited thereto. That is, in the front portion 412A, the region in contact with the bottom surface 4111B of the stem 4111 may have a planar shape, and concavo-convexes may be formed in other regions. The same applies to the bottom portion 4192A in the hole portion 4191 of the base member 419.

Although in the foregoing first to fourth embodiments, the opening 4131 which has a substantially circular shape in plan view and the convex portion 4132 which is formed at the edge of the opening 4131 and inserted into the second concave portion 4113 of the stem 4111 are formed in the spacer 413, and the opening 4131 and the convex portion 4132 function as a positioning portion, the invention is not limited thereto. That is, the solid-state light source 411 may be positioned using a positioning portion having a different configuration, or the convex portion and the concave portion may be provided reversely. Like the light source unit 41A in the foregoing fifth embodiment, no spacer 413 may be provided.

Although in the foregoing embodiments, the Direction A which connects two terminals 4116 extending from the stem 4111 of the solid-state light source 411 is aligned with the X direction along the length direction of the base member 412 when the solid-state light source 411 is arranged on the base member 412, the invention is not limited thereto. That is, the solid-state light sources 411 may be arranged such that the Direction A and the Y direction are aligned with each other. In this case, if the groove portions 4122 are formed in the rear portion 412B in the Y direction, and the substrates 416 are arranged in the groove portions 4122, as in the foregoing embodiments, the effects, such as reduction in the size of the substrates 416, can be obtained.

Although in the foregoing first to third, fifth, and sixth embodiments, the number of projections which are pressing portions formed at the edge of the opening is two, and in the foregoing fourth embodiment, the number of projections is three and four, the invention is not limited thereto. For example, the number of pressing portions which press the single solid-state light source may be one or five or more. That is, the number of pressing portions may be appropriately set. The shape of the opening formed in the pressing member may be appropriately changed.

Although in the foregoing embodiments, the bottom surface 4111B (in the stem 4111, the surface opposite the surface on which the light-emitting element is provided) of the stem 4111 in the solid-state light source 411 is heat-conductively in contact with the base member 412 or 419, the invention is not limited thereto. That is, it should suffice that, taking into consideration the projection direction of the terminals 4116 or the like, a predetermined region in the stem 4111 of each solid-state light source 411 is thermally conductively in contact with the base member.

Although in the foregoing embodiments, the projector includes three light modulating devices 34 (34R, 34G, and 34B), the invention is not limited thereto. That is, the invention may be applied to a projector which uses two or less light modulating device or four or more light modulating devices.

Although in the foregoing embodiments, a light modulating device having a transmissive liquid crystal panel, in which a light incident surface and a light emitting surface are different is used, a light modulating device having a reflective liquid crystal panel, in which a light incident surface and a light emitting surface are identical, may be used.

Although in the foregoing embodiments, the projector includes the light modulating devices 34 each having a liquid crystal panel, a light modulating device having a different configuration may be used insofar as a light modulating device modulates incident light flux to form an optical image in accordance with image information. For example, the invention may be applied to a projector using a light modulating device other than liquid crystal, such as a device using a micro mirror. The kinds of optical components which are used in an optical device, the layout of the optical components, and the like are not limited to the kinds and the layout described in the foregoing embodiments, and may be appropriately changed.

Although in the foregoing embodiments, the first light source device 4 is used in the projector, the invention is not limited thereto. That is, a light source device having the configuration of the first light source device 4 may be used in an illumination device, such as a table lamp.

Although in the foregoing embodiments, the first light source device 4 has, in addition to the light source unit 41, 41A, or 41B, the reflection mirror 42, the condensing lens 43, the case 44, the parallelization lens 45, the uniformization device 46, the dichroic prism 47, the pickup lens 48, and the wavelength conversion device 49, the invention is not limited thereto. That is, it should suffice that a light source device having a configuration corresponding to the light source unit 41, 41A, or 41B is used. The LD which is used in the light source unit is not limited to an LD which emits light in an ultraviolet region, and an LD which emits a different kind of light (for example, blue light). Instead of the LD, a solid-state light source, such as LED, may be used. The number of terminals of the solid-state light source may be three or more.

The invention may be applied in a light source device and the light source device may be suitably used as a light source device of a projector.

The entire disclosure of Japanese Patent Application No. 2011-173736, filed on Aug. 9, 2011 is expressly incorporated by reference herein.

What is claimed is:

1. A light source device comprising:
a solid-state light source emitting light;
a base member having an arrangement surface on which the solid-state light source is arranged; and
a pressing member having a pressing portion provided on the base member to fix the solid-state light source through pressing of the solid-state light source toward the arrangement surface,
wherein
the pressing member has an opening through which the solid-state light source extends, the opening having an edge surrounding the solid-state light source, and
the pressing portion is a projection which projects inward from a portion of the edge of the opening, in plan view, to cover a portion of the solid-state light source, the projection pressing the solid-state light source toward the arrangement surface.

2. The light source device according to claim 1, wherein the opening transmits light emitted from the solid-state light source.

3. The light source device according to claim 2, wherein the projection is formed in a substantially trapezoidal shape in plan view in which the width dimension becomes smaller as the projection is directed from the edge of the opening to the inside of the opening.

4. The light source device according to claim 2, wherein a plurality of the solid-state light sources are arranged in a straight line along a predetermined direction, and
the pressing portion is provided so that a projection direction of the pressing portion from the edge of the opening is inclined with respect to the predetermined direction.

5. The light source device according to claim 1, further comprising:
a position determination member provided between the base member and the pressing member to determine the position of the solid-state light source arranged on the base member; and
a fixing member mounted on the base member to fix the pressing member to the base member.

6. The light source device according to claim 1, wherein a plurality of the solid-state light sources are arranged on the base member, and
the pressing member has a plurality of the pressing portions pressing the solid-state light sources.

7. A projector comprising:
the light source device according to claim 1;
a light modulating device modulating light flux emitted from the light source device; and
a projection optical device projecting the modulated light flux.

8. A projector comprising:
the light source device according to claim 2;
a light modulating device modulating light flux emitted from the light source device; and
a projection optical device projecting the modulated light flux.

9. A projector comprising:
the light source device according to claim 3;
a light modulating device modulating light flux emitted from the light source device; and
a projection optical device projecting the modulated light flux.

10. A projector comprising:
the light source device according to claim 4;
a light modulating device modulating light flux emitted from the light source device; and a projection optical device projecting the modulated light flux.

11. A projector comprising:

the light source device according to claim 5;

a light modulating device modulating light flux emitted from the light source device; and a projection optical device projecting the modulated light flux.

12. A projector comprising:

the light source device according to claim 6;

a light modulating device modulating light flux emitted from the light source device; and a projection optical device projecting the modulated light flux.

* * * * *